United States Patent
Shim et al.

(10) Patent No.: US 9,176,808 B2
(45) Date of Patent: Nov. 3, 2015

(54) STORAGE DEVICE AND NONVOLATILE MEMORY DEVICE AND OPERATING METHOD THEREOF

(71) Applicants: Hojun Shim, Gyeonggi-do (KR); Je-Hyuck Song, Seoul (KR); Kwanggu Lee, Gyeonggi-do (KR)

(72) Inventors: Hojun Shim, Gyeonggi-do (KR); Je-Hyuck Song, Seoul (KR); Kwanggu Lee, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 173 days.

(21) Appl. No.: 13/724,011

(22) Filed: Dec. 21, 2012

(65) Prior Publication Data

US 2013/0179752 A1 Jul. 11, 2013

(30) Foreign Application Priority Data

Jan. 9, 2012 (KR) .................. 10-2012-0002559

(51) Int. Cl.
*G11C 29/00* (2006.01)
*G06F 11/10* (2006.01)

(52) U.S. Cl.
CPC ............ *G06F 11/10* (2013.01); *G06F 11/1004* (2013.01)

(58) Field of Classification Search
CPC ............ H04L 65/608; H04W 28/0273; H04B 7/0456; H04B 7/0452; G06F 12/0246; G06F 2212/214; G06F 2212/401; G06F 3/0679; G06F 3/0608; G06F 3/061; G06F 3/0656; G06F 2212/7203; G06F 11/1048; H03M 13/6312; H03M 13/35; H03M 7/30
See application file for complete search history.

(56) References Cited

U.S. PATENT DOCUMENTS

| | | | |
|---|---|---|---|
| 5,237,460 A | 8/1993 | Miller et al. | |
| 5,778,411 A | 7/1998 | DeMoss et al. | |
| 6,115,787 A | 9/2000 | Obara | |
| 7,111,142 B2 * | 9/2006 | Spencer et al. | 711/170 |
| 7,424,482 B2 | 9/2008 | Kedem et al. | |
| 8,533,558 B2 * | 9/2013 | Yurzola et al. | 714/758 |
| 8,533,564 B2 * | 9/2013 | Yurzola et al. | 714/763 |
| 8,543,783 B2 * | 9/2013 | Takano et al. | 711/161 |
| 2004/0054847 A1 * | 3/2004 | Spencer et al. | 711/104 |
| 2008/0141043 A1 * | 6/2008 | Flynn et al. | 713/193 |
| 2010/0020199 A1 * | 1/2010 | Meitav et al. | 348/231.99 |
| 2010/0082537 A1 | 4/2010 | Lasser | |
| 2011/0154158 A1 * | 6/2011 | Yurzola et al. | 714/758 |
| 2011/0154160 A1 * | 6/2011 | Yurzola et al. | 714/763 |
| 2011/0157992 A1 * | 6/2011 | Strasser et al. | 365/185.18 |
| 2011/0202630 A1 * | 8/2011 | Morohashi | 709/217 |
| 2011/0252007 A1 | 10/2011 | Cho et al. | |
| 2011/0252184 A1 | 10/2011 | Cho et al. | |

(Continued)

FOREIGN PATENT DOCUMENTS

| KR | 100242996 | 11/1999 |
|---|---|---|
| KR | 1020070031647 | 3/2007 |

(Continued)

*Primary Examiner* — Guerrier Merant
(74) *Attorney, Agent, or Firm* — F. Chau & Associates, LLC

(57) ABSTRACT

A storage device which includes a user area of a memory cell array; a buffer area configured to temporarily store compressed data to be written into the user area; and compressed data management logic configured to control the user area and the buffer area such that compressed data stored in the buffer area is written into the user area. The compressed data management logic manages compressed data to be written into the user area by an ECC block unit rather than by a page-size unit.

24 Claims, 24 Drawing Sheets

(56) References Cited

U.S. PATENT DOCUMENTS

| | | | |
|---|---|---|---|
| 2012/0059497 A1* | 3/2012 | Morohashi | 700/94 |
| 2012/0203955 A1* | 8/2012 | Kim et al. | 711/103 |
| 2012/0317334 A1* | 12/2012 | Suzuki et al. | 711/103 |
| 2013/0166861 A1* | 6/2013 | Takano et al. | 711/161 |
| 2013/0205114 A1* | 8/2013 | Badam et al. | 711/207 |
| 2014/0215095 A1* | 7/2014 | Morohashi | 710/6 |

FOREIGN PATENT DOCUMENTS

| | | |
|---|---|---|
| KR | 1020090034135 | 4/2009 |
| KR | 1020110016324 | 2/2011 |
| KR | 1020110113420 | 10/2011 |
| KR | 1020110113421 | 10/2011 |

* cited by examiner

Fig. 7

Compressed Data Manage Table

|  | PA | SNE | EBL |
|---|---|---|---|
| Raw data 1 | 1 | 1 | 5 |
| Raw data 2 | 1 | 6 | 2 |

Fig. 8

Unified Mapping Table

|  | LA | PA | SNE | EBL | CI |
|---|---|---|---|---|---|
| Raw data 1 | 1 | 1 | 1 | 5 | Y |
| Raw data 2 | 2 | 1 | 6 | 2 | Y |
|  | 3 | 2 | 1 | 2 | N |
|  | ⋮ | ⋮ | ⋮ | ⋮ | ⋮ |

Unified Mapping Table

|  | LA | PA | SNE | EBL | CI |
|---|---|---|---|---|---|
| Raw data 1 | 1 | 1 | 1 | 6 | Y |
| Raw data 2 | 2 | 1 | 7 | 4 | Y |
| Raw data 3 | 3 | 2 | 3 | 6 | Y |
| ⋮ | ⋮ | ⋮ | ⋮ | ⋮ | ⋮ |

STORAGE DEVICE AND NONVOLATILE MEMORY DEVICE AND OPERATING METHOD THEREOF

CROSS-REFERENCE TO RELATED APPLICATIONS

A claim for priority under 35 U.S.C. §119 is made to Korean Patent Application No. 10-2012-0002559 filed Jan. 9, 2012, the entirety of which is incorporated by reference herein.

BACKGROUND

1. Technical Field

The inventive concepts described herein relate to a storage device, and more particularly, relate to a nonvolatile memory device and an operating method thereof.

2. Discussion of the Related Art

Semiconductor memory devices used storage devices includes volatile memories such as a dynamic RAM (DRAM), a static RAM (SRRAM), and the like and nonvolatile memories such as an electrically erasable and programmable ROM (EEPROM), a ferroelectric RAM (FRAM), a phase-change RAM (PRAM), a magnetoresistive RAM (MRAM), a flash memory, and the like. The volatile memories lose their stored contents at power-off, while the nonvolatile memories retain contents stored therein even at power-off.

In recent years, the number and type of consumer electronic devices using nonvolatile memory has increased. For example, an MP3 player, a digital camera, a cellular phone, a camcorder, a flash card, and a solid state disk (SSD) may use a nonvolatile memory as a data storage device. A flash memory is a nonvolatile memory and, may support a function of electrically erasing cell data in a block. This enables the flash memory to be widely used as a storage device in place of a hard disk drive.

As the storage capacity required by the user increases, a technique of using the storage space of a flash memory efficiently is desirable.

SUMMARY

Exemplary embodiments of the inventive concept provide a storage device which comprises a user area of a (nonvolatile) memory cell array; a buffer area (e.g., RAM) configured to temporarily store compressed data to be written into the user area; and compressed data management logic configured to control the user area and the buffer area such that compressed data stored in the buffer area is written into the user area. The compressed data management logic manages compressed data to be written into the user area by an ECC block unit (e.g., multiple pages).

In exemplary embodiments, the ECC block unit is a bit-size that assures the reliability of compressed data to be written into the user area.

In exemplary embodiments, the ECC block unit includes a data bit region being user data information and an ECC bit region used to detect and correct any error of the data bit region.

In exemplary embodiments, at a program operation, collected compressed data stored in the buffer area is written into the user area by the program unit (e.g., one or more page size) larger than the ECC block unit.

In exemplary embodiments, the program unit is an integer multiple of the ECC block unit.

In exemplary embodiments, the buffer area temporarily stores first compressed data and second compressed data and the compressed data management logic programs the collected first and second compressed data into the same page in the user area.

In exemplary embodiments, the storage device further comprises a compressor configured to compress write-requested raw data; and an ECC circuit configured to add an ECC bit to raw data compressed by the compressor to generate compressed data to be written into the user area.

In exemplary embodiments, the storage device further comprises a compressed data management table configured to manage location information of compressed data stored in the user area, wherein the compressed data management table manages location information of compressed data stored in the user area by an ECC block unit smaller than the program unit (e.g., one or more page size) according to a control of the compressed data management logic.

In exemplary embodiments, the compressed data management table manages information associated with the physical address of compressed data stored in the user area, information associated with the start number of ECC block of the compressed data stored in the user area, and information associated with the ECC block length of the compressed data stored in the user area.

In exemplary embodiments, the compressed data management table further manages information associated with a logical address corresponding to the physical address of the compressed data stored in the user area.

In exemplary embodiments, the compressed data management table manages information associated with physical addresses of first and second compressed data stored in the user area and the first and second compressed data has the same physical address.

In exemplary embodiments, the compressed data management logic determines whether or not to program second compressed data into the user area with first compressed data, based on the bit-size of an empty region of the first compressed data.

In exemplary embodiments, when the bit-size of the empty region of the first compressed data is larger than the bit-size of the second compressed data, the first and second compressed data is programmed into the same page of the user area.

In exemplary embodiments, when the bit-size of the empty region of the first compressed data is smaller than the bit-size of the second compressed data, the first compressed data is programmed into the user area.

In exemplary embodiments, a write-requested point of time of the first compressed data is prior to a write-requested point of time of the second compressed data.

In exemplary embodiments, the buffer area includes a waiting region temporarily storing a plurality of compressed data and the compressed data management logic compares the bit-size of write-requested compressed data with an empty region of each of the plurality of compressed data stored in the waiting region.

In exemplary embodiments, if the bit-size of the write-requested compressed data is smaller than an empty region of a selected one of a plurality of compressed data stored in the waiting region, then the compressed data management logic programs the write-requested compressed data and the selected compressed data at into same page of the user area.

In exemplary embodiments, if the bit-size of the write-requested compressed data is larger than empty regions of a plurality of compressed data stored in the waiting region, then the compressed data management logic transfers the write-requested compressed data to the waiting region.

In exemplary embodiments, the compressed data management logic compares the bit-size of the waiting region with a reference bit-size, and programs a selected one of a plurality of compressed data stored in the waiting region when the bit-size of the waiting region is larger than the reference bit-size.

In exemplary embodiments, the compressed data management logic compares the bit-size of an empty region of first compressed data with the bit-size of second compressed data, and divides the second compressed data if the bit-size of the empty region of the first compressed data is smaller than the bit-size of the second compressed data.

In exemplary embodiments, the compressed data management logic divides the second compressed data into first and second divided compressed data and the bit-size of the first divided compressed data is smaller than the bit-size of an empty region of the first compressed data.

In exemplary embodiments, the compressed data management logic programs the first compressed data and the first divided compressed data into the same page of the user area.

In exemplary embodiments, the compressed data management logic temporarily stores the second divided compressed data in the buffer area.

In exemplary embodiments, the compressed data management logic simultaneously programs at least one or more compressed data stored in the buffer area into a plurality k of pages of the user area. The number k of pages of the user area is preferably less than the number of compressed data.

Another aspect of the inventive concept provides a nonvolatile memory device comprising a nonvolatile memory configured to perform a program operation by a program unit having a bit-size k times the bit-size of a pages of the nonvolatile memory, wherein k is an integer a buffer memory configured to temporarily store compressed data to be programmed into the nonvolatile memory; and compressed data management logic configured to control the nonvolatile memory and the buffer memory such that compressed data stored in the buffer memory is programmed into the nonvolatile memory. The compressed data management logic manages compressed data stored in the nonvolatile memory by an ECC block unit smaller than the bit-size of one page of the nonvolatile memory.

In exemplary embodiments, the buffer memory includes a plurality of collected compressed data, the plurality of compressed data stored in the buffer memory to be simultaneously programmed into the nonvolatile memory when the bit-size of a plurality of compressed data stored in the buffer memory is smaller than the program unit of k pages.

In exemplary embodiments, the nonvolatile memory device further comprises a compressed data management table configured to manage location information of compressed data stored in the nonvolatile memory. The compressed data management table manages location information of compressed data stored in the nonvolatile memory by an ECC block unit smaller than the bit-size of a page under a control of the compressed data management logic.

In exemplary embodiments, the compressed data management table manages information associated with the physical address of compressed data stored in the nonvolatile memory, information associated with a start number of ECC block of the compressed data stored in the nonvolatile memory, and information associated with the ECC block length of the compressed data stored in the nonvolatile memory.

In exemplary embodiments, the compressed data management table further manages information associated with a logical address of the compressed data stored in the nonvolatile memory.

In exemplary embodiments, the nonvolatile memory includes a plurality of compressed data programmed by one program operation, and predetermined compressed data of the plurality of compressed data is divided to be stored in at least two pages of the nonvolatile memory.

Another aspect of the inventive concept provides an operating method of a nonvolatile memory device comprising compressing write-requested data; collecting the compressed data in a random access memory (RAM) buffer; programming compressed data collected at the RAM into a nonvolatile memory; and updating a compressed data management table managing compressed data stored in the nonvolatile memory by an ECC block unit.

In exemplary embodiments, the operating method further comprises comparing the bit-size of the write-requested data with the bit-size of an empty region of previous compressed data. If the bit-size of the write-requested data is smaller than the bit-size of the empty region of the previous compressed data, then the write-requested data and the previous compressed data are programmed into the same page of the nonvolatile memory.

In exemplary embodiments, the operating method further comprises comparing the bit-size of the write-requested data with the bit-size of each of empty regions of a plurality of compressed data stored in the RAM. If the bit-size of the write-requested data is smaller than the bit-size of an empty region of a selected one of the plurality of compressed data stored in the RAM, then the write-requested data and the selected compressed data are programmed into the same page of the nonvolatile memory.

In exemplary embodiments, the bit-size of the write-requested data is larger than the bit-size of empty regions of a plurality of compressed data stored in the RAM, the write-requested data is stored in the RAM.

In exemplary embodiments, the operating method further comprises comparing the bit-size of a plurality of compressed data stored in the RAM with a reference bit-size when the write-requested data is stored in the RAM. If the bit-size of the plurality of compressed data stored in the RAM is larger than the reference bit-size, then predetermined compressed data of the plurality of compressed data stored in the RAM is programmed into the nonvolatile memory.

Another aspect of the inventive concepts provides an operating method of a nonvolatile memory device comprising: sequentially receiving first write-requested data and second write-requested data; sequentially compressing first write-requested data and second write-requested data; collecting the first and second compressed data in a random access memory (RAM) buffer; programming the first and second compressed data collected in the RAM into a nonvolatile memory; and updating a compressed data management table for managing compressed data stored in the nonvolatile memory.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the bit-size and relative bit-sizes of layers and regions may be exaggerated for clarity. Like numbers refer to like elements throughout.

It will be understood that, although the terms first, second, third etc. may be used herein to describe various elements, components, regions and/or sections, these elements, components, regions and/or sections should not be limited by these terms. These terms are only used to distinguish one element, component, region or section from another region or section. Thus, a first element, component, region or section discussed below could be termed a second element, component, region or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another layer, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

BRIEF DESCRIPTION OF THE FIGURES

The above and other features will become apparent from the following description with reference to the following figures, wherein like reference numerals refer to like parts throughout the various figures unless otherwise specified, and wherein:

FIGS. 6 to 8 are diagrams illustrating an operation of the flash memory system of FIG. 3;

DETAILED DESCRIPTION OF EXEMPLARY EMBODIMENTS

Figure 1:
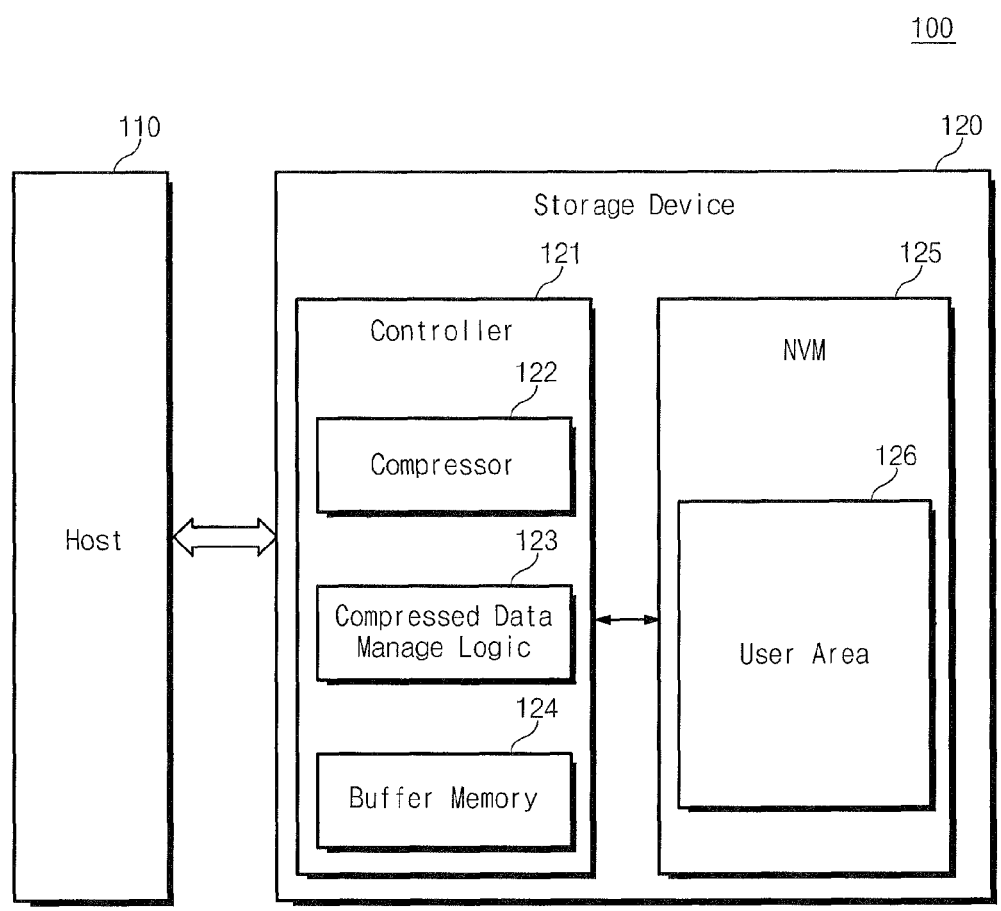
FIG. 1 is a block diagram of a memory system according to an embodiment of the inventive concept.

FIG. 1 is a block diagram of a memory system according to an embodiment of the inventive concept. Referring to FIG. 1, a memory system 100 includes a host 110 and a storage device 120. The storage device 120 includes a controller 121 and a nonvolatile memory 125.

The controller 121 controls the overall operation of the storage device 120 in response to a request of the host 110. For example, the controller 121 may control the read the write operations of the nonvolatile memory 125 in response to read and write requests of the host 110.

The nonvolatile memory 125 may be controlled by the controller 121, and may perform operations (e.g., reading or writing) corresponding to the requests of the controller 121. The nonvolatile memory 125 includes a user area 126 which is used to store data (e.g., compressed user data).

The memory system 100 according to an embodiment of the inventive concept may manage compressed data by the ECC block. The ECC block may be less than the bit-size of one page of the memory device. The memory system 100 according to an embodiment of the inventive concept may be configured to compress data, collect compressed data, and write the collected compressed data. Hereinafter, this operation may be referred to as a 'collective write operation' for collected data. With the collective write operation, compressed data may be gathered at a RAM buffer memory 124, and two or more compressed data collected at the buffer memory 124 may be written according to the program unit (e.g., the size of one or more pages) of the user area 126.

The controller 121 according to an embodiment of the inventive concept includes a compressor 122, compressed data management logic 123, and the buffer memory 124.

The compressor 122 may be configured to compress data transferred from the host 110. The compressed data may be temporarily stored in the buffer memory 124. The compressed data management logic 123 may be configured to manage compressed data stored in the buffer memory 124 and the user area 126 by an ECC block unit. Herein, the ECC block unit may indicate a minimum-sized unit capable of securing the reliability of data.

The memory system 100 may maximize utilization of a storage space of the user area 126 by managing compressed data by the ECC block unit and performing a 'collective write operation' on the compressed data. Further, the memory system 100 may minimize the number of program operations executed to program compressed data into the user area 126.

Below, there will be described the cases that compressed data is managed by an ECC block unit (e.g., 1K Bytes) and that compressed data is managed by a unit (e.g., 8K Bytes) larger than the ECC block unit.

For ease of description, it is assumed that the buffer memory 124 has the bit-size of a first unit (e.g., 8 KB) and data stored in the buffer memory 124 is stored in a storage space, having the first unit, of the user area 126 (i.e., a storage space of 8 KB). Also, it is assumed that the ECC block unit has a second unit smaller than the first unit. Also, it is assumed that first and second compressed data (e.g., 5 KB and 2 KB) having the bit-size smaller than the first unit and larger than the second unit is programmed into the user area 126.

In the event that data stored in the buffer memory 124 and the user area 126 is managed by the first unit (8 KB), the first and second compressed data must be independently programmed into the user area 126, respectively. If the first and second compressed data is programmed into the same storage space (storage space of 8K) of the user area 126, the controller 121 may not divide the first and second compressed data. This may mean that a storage space of the user area 126 is wasted. For example, when the bit-size of the first compressed data is 5 KB, a storage space of 3 KB (8 KB-5 KB) may be wasted.

To solve the above-described drawback, the storage device 120 according to an embodiment of the inventive concept may manage compressed data by a second unit (or, referred to as an ECC block unit) of 1 KB. In this case, although the first and second compressed data is programmed into the same storage space (i.e., a storage space of 8 KB), the controller 121 may divide the first and second compressed data.

Since the first and second compressed data is collected at the buffer memory 124 and the first and second compressed data collected at the buffer memory 124 is programmed into the user area 126 according to one program command, the storage device 120 may reduce the number of program operations compared with the case that compressed data is managed by the first unit.

Figure 2:
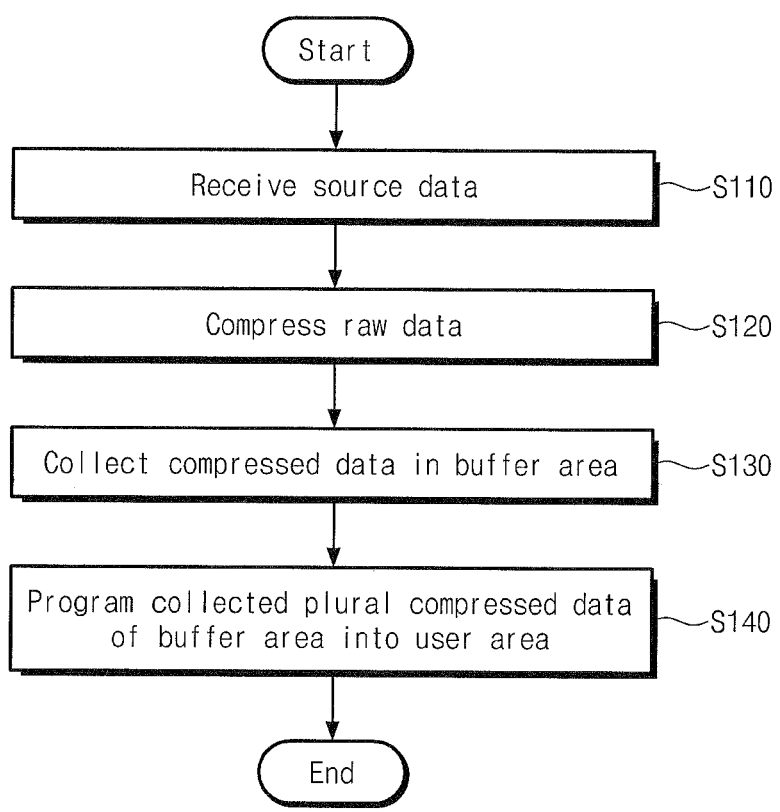
FIG. 2 is a flowchart illustrating a method of operation of the memory system of FIG. 1.

FIG. 2 is a flowchart illustrating a method of operation of the memory system in FIG. 1.

In step S110, a storage device 120 may receive source data from a host 110.

In step S120, a compressor 122 of the storage device 120 may compress raw data. Herein, the raw data may mean data which is not compressed by the compressor 122 and corresponds to a compression unit of the compressor 122. If the bit-size of the source data is larger than the compression unit of the compressor 122, a controller 121 may partition the source data by the compression unit to generate raw data, and then the compressor 122 may compress the raw data.

In step S130, data compressed by the compressor 122 may be collected at a buffer memory 124. If the buffer memory 124 has the bit-size of 8 KB, first compressed data has the bit-size of 5 KB, and second compressed data has the bit-size of 2 KB, the first compressed data and the second compressed data may be sequentially collected at the buffer memory 124.

In step S140, a plurality of compressed data collected at the buffer memory 124 may be programmed into the user area 126. For example, the first and second compressed data collected at the buffer memory 124 may be simultaneously programmed into the user area 126 using one program command. A compressed data management logic 123 may manage the first and second compressed data by an ECC block unit (i.e., 1 KB). Thus, the compressed data management logic 123 may efficiently and exactly find locations of the user area 126 where the first and second compressed data is stored.

As described above, the storage device 100 according to an embodiment of the inventive concept supports a collective write operation for compressed data and manages data stored in the user area 126 by the ECC block unit. Thus, it is possible to use the storage space of the user area 126 efficiently.

The storage device 100 may further include an ECC circuit. When data is programmed into a nonvolatile memory 125, the ECC circuit performs encoding by the ECC block unit. When data is read out from the nonvolatile memory 125, the ECC circuit may perform decoding by the ECC block unit. The reliability of data may be secured by managing data in the size of ECC block unit. Further, it is possible to maximize use of a storage space of the user area 126.

A nonvolatile memory 125 in FIG. 1 may be implemented using various memories. For example, the nonvolatile memory 125 may be formed of a flash memory, a Magnetic RAM (MRAM), a Spin-Transfer Torgue MRAM (STT-MRAM), a Conductive Bridging RAM (CBRAM), a Phase-change RAM (PRAM) called OUM (Ovonic Unified Memory), a Resistive RAM (RRAM or Re-RAM), a nanotube RAM, a Polymer RAM (PoRAM), a Nano Floating Gate Memory (NFGM), a holographic memory, a molecular electronics memory, an insulator resistance change memory, or the like.

Below, there will be described an exemplary embodiment that the nonvolatile memory 125 in FIG. 1 is formed of a flash memory.

Figure 3:
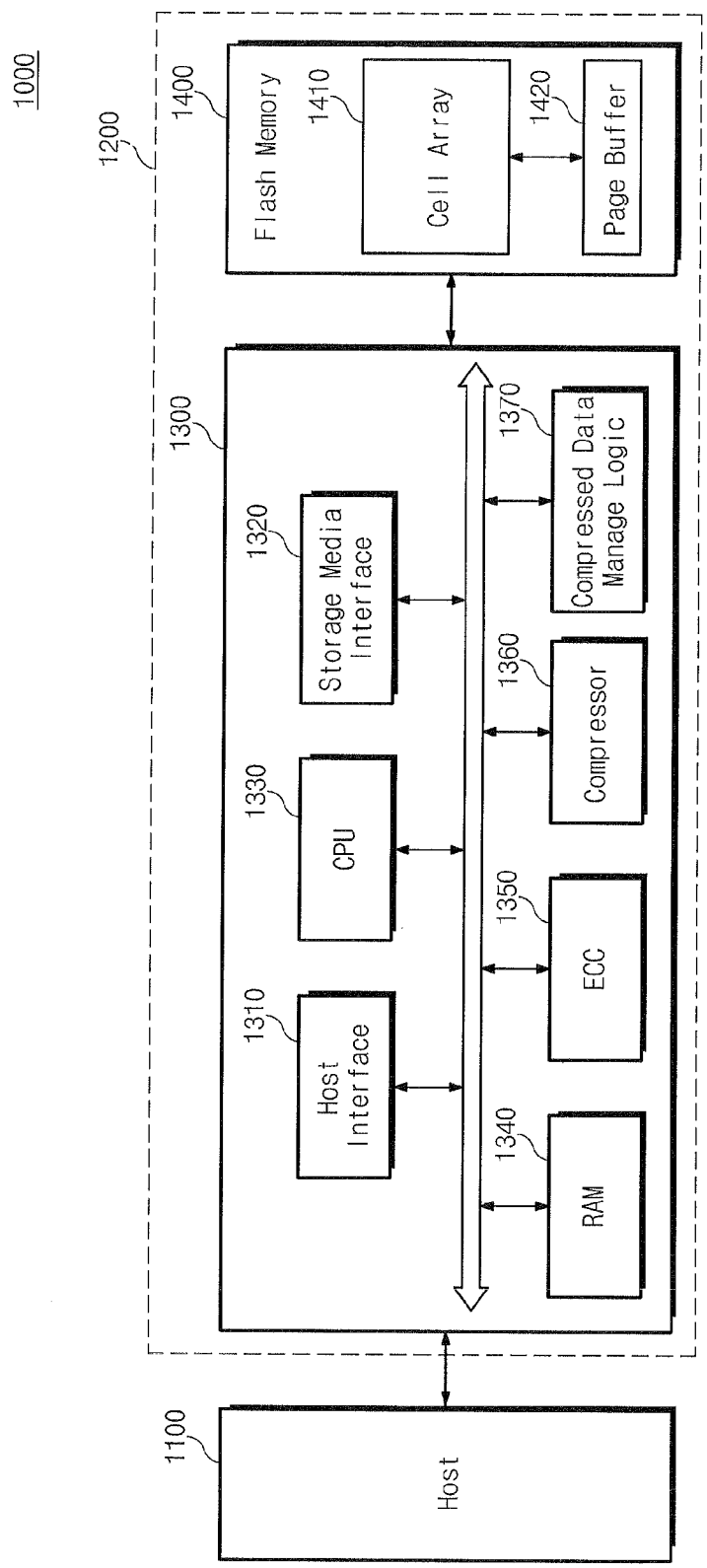
FIG. 3 is a block diagram of a flash memory system according to an embodiment of the inventive concept.

FIG. 3 is a block diagram of a flash memory system according to an embodiment of the inventive concept. A flash memory system 1000 includes a host 1100 and a flash storage device 1200. To efficiently use a storage space of a flash memory 1400, the flash storage device 1200 supports a 'collective write operation' and manages data stored in the flash memory 1400 by an ECC block unit.

Referring to FIG. 3, the flash storage device 1200 includes a controller 1300 and the flash memory 1400. The controller 1300 controls the overall operation of the flash memory 1400 in response to a request of the host 1100. For example, the controller 1300 may control writing or reading on the flash memory 1400. The controller 1300 includes a host interface 1310, a storage media interface 1320, a CPU 1330, a RAM 1340, an ECC circuit 1350, a compressor 1360, and compressed data management logic 1370.

The host interface 1310 is configured to interface with the host 1100, and the storage media interface 1320 is configured to interface with the flash memory 1400. The host interface 1310 may be connected with the host 1100 via one or more channels (or, ports). For example, the host interface 1310 may be connected with the host 1100 via one of a parallel AT attachment (PATA) bus and a serial AT attachment (SATA) bus or via both the PATA bus and the SATA bus. Alternatively, the host interface 1310 may be connected with the host 1100 via SCSI, USB, or the like.

The CPU 1330 controls the overall operation of the flash storage device 1200. Although not shown in FIG. 3, the CPU 1330 may be implemented to include a processor, an SRAM, a DMA controller, and the like.

The RAM 1340 may operate responsive to the control of the CPU 1330 or to the compressed data management logic 1370, and may be used as a work memory, a buffer memory, a cache memory, and/or the like. The RAM 1340 may be formed of one or more chips.

When the RAM 1340 is used as the work memory, it may be used to temporarily store data processed by the CPU 1330.

When the RAM 1340 is used as the buffer memory, it may be used to temporarily store and collect the compressed data to be transferred to the flash memory 1400 or data transferred from the flash memory 1400. For example, the RAM 1340 may be used to temporarily store one or more compressed data to be transferred to the flash memory 1400.

The RAM 1340 may be used as a driver memory for driving a flash translation layer (FTL). The flash translation layer may translate logical addresses from the host 1100 into physical addresses of the memory cell array 1410, and may be used to manage a merge operation of the flash memory 1400, a mapping table, and the like. The RAM 1340 may be used to store a mapping table managed by the flash translation layer or a compressed data management table managed by the compressed data management logic 1370. The RAM 1340 may be used to store a unified mapping table in which the mapping table and the compressed data management table are unified.

The ECC circuit 1350 generates an error correction code (ECC) for correcting erroneous bits of the data received from the flash memory 1400. The ECC circuit 1350 may encode data being provided to the flash memory 1400 to generate data to which ECC information (or, parity information) are attached. The ECC/parity information may be stored in a meta area of the cell array 1410. The ECC circuit 1350 may decode output data to judge whether the decoding operation is successful. The ECC circuit 1350 may output an indication signal according to a judgment result and correct erroneous bits of the output data using ECC information.

The ECC circuit 1350 may make error correction using LDPC (low density parity check) code, BCH code, turbo code, Reed-Solomon code, convolution code, RSC (recursive systematic code), coded modulation such as TCM (trellis-coded modulation), BCM (Block coded modulation), or the like. The ECC circuit 1350 may include one or all of an error correction circuit, an error correction system, and an error correction device.

The compressor 1360 may operate responsive to the control of the CPU 1330 (or, the compressed data management logic 1370), and may sequentially compress data provided from the host 1100 according to a compression unit. For example, data provided from the host 1100 may be stored in the RAM 1340, and data stored in the RAM 1340 may be divided by the compression unit according to the control of the CPU 1330 (or, the compressed data management logic 1370). The compressor 1360 may sequentially compress data divided according to the compression unit.

The ECC circuit 1350 may attach ECC information to data compressed by the compressor 1360, and resultant data may be collected at a predetermined area of the RAM 1340. Afterwards, compressed data collected at the RAM 1340 may be programmed into the cell array 1410 through a page buffer 1420. The compressor 1360 may decompress data read out from the flash memory 1400 in response to the control of the CPU 1330 (or, the compressed data management logic 1370).

The compressed data management logic 1370 manages compressed data stored in the flash memory 1400 by an ECC block unit. Herein, the ECC block unit may be the minimum bit-size capable of securing the reliability of data stored in the flash memory 1400. It is assumed that ECC information is added to compressed data having the bit-size of 8 KB. In this case, the reliability of the compressed data may be secured by a 1 KB unit using ECC information. Herein, the ECC block unit may have the bit-size of 1 KB.

The compressed data management logic 1370 manages compressed data stored in the flash memory 1400 by the ECC block unit. The compressed data management logic 1370 may collect a plurality of compressed data at the RAM 1340, and may control the flash memory 1400 such that the plurality of compressed data collected at the RAM 1340 is collectively programmed into the cell array 1410 through the page buffer 1420 at the same time.

The compressed data management logic 1370 manages location information (or, physical address (PA) information) of compressed data stored in the cell array 1410 using the compressed data management table. Alternatively, the compressed data management logic 1370 may manage location information of compressed data stored in the cell array 1410 by unifying the compressed data management table and a mapping table managed by the flash translation layer. The flash memory 1400 includes the cell array 1410 and the page buffer 1420.

The cell array 1410 may store data transferred from the host 1100 or data compressed by the compressor 1360. The page buffer 1420 may temporarily store data to be programmed into the cell array 1410 or data read out from the cell array 1410. The flash memory 1400 will be more fully described with reference to FIGS. 4 and 5.

Figure 4:
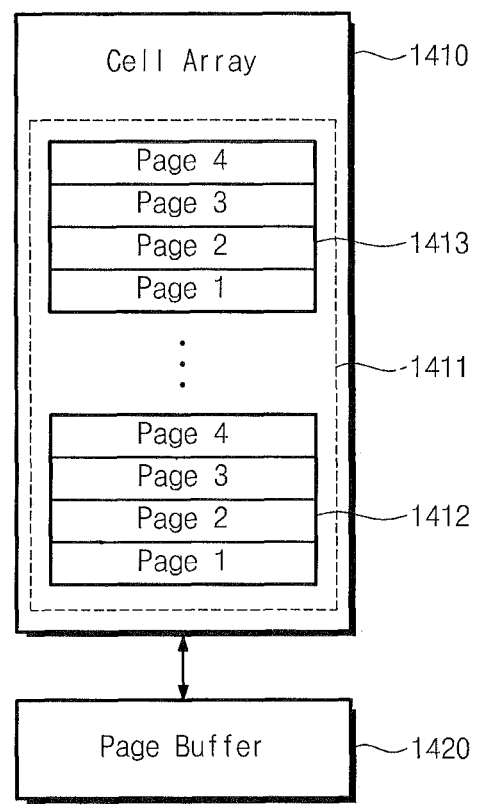
FIG. 4 is a block diagram schematically illustrating a cell array and a page buffer in the flash memory of FIG. 3.

FIG. 4 is a block diagram schematically illustrating a cell array and a page buffer in the flash memory of FIG. 3. For ease of description, it is assumed that a cell array 1410 is formed in one plane of a semiconductor. Referring to FIG. 4, the cell array 1410 includes a plane 1411, which includes a plurality of memory blocks 1412 to 1413. Each memory block may include a plurality of pages.

While programming (writing), data stored in the page buffer 1420 may be stored in the cell array 1410 page by page. While reading, data stored in a page of the cell array 1410 may be read through the page buffer 1420 by the page unit (i.e., page by page).

If data stored in the cell array 1410 is managed by the page unit, different data may be stored in different pages, respectively. This may be to prevent different data from being recognized as one data when different data is programmed into one page and then read therefrom. The storage space of each page may be wasted when data stored in the cell array 1410 is managed by the page unit.

Aspects of the invention overcome the above-described drawback, because compressed data management logic 1370 according to an embodiment of the inventive concept may manage data stored in the cell array 1410 by an ECC block unit (e.g., a bit-size smaller than one page).

Figure 5:
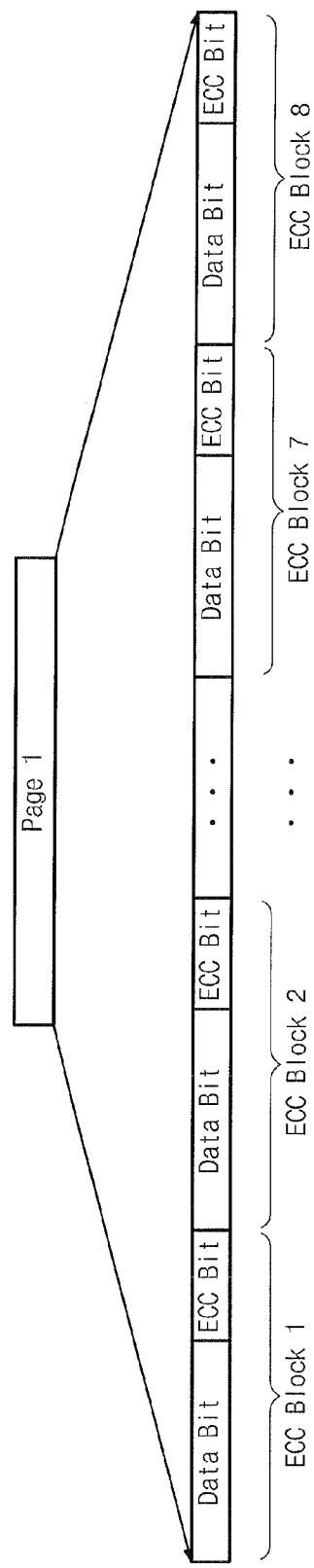
FIG. 5 is a diagram schematically illustrating a structure of data stored in one page in the page buffer in FIG. 4.

FIG. 5 is a diagram schematically illustrating a structure of data stored in one page in the page buffer in FIG. 4. In FIG. 5, a first page of a memory block 1412 in FIG. 4 is exemplarily illustrated. For ease of description, it is assumed that one page include eight ECC blocks.

Referring to FIG. 5, a first page may include eight ECC blocks. Each ECC block may include at least one data bit (i.e., data bits) and an ECC bit (i.e., ECC bits). The data bit may mean data write-requested by the host 1100, and the ECC bit may mean a parity bit added through an ECC circuit 1350 (refer to FIG. 3) to secure the reliability of the data bit(s).

For example, in the event that data of 8 KB is stored in the first page, each data bit may have the bit-size of 1 KB, and each ECC bit may be appended to each data bit of 1 KB. In this case, the ECC block may have the bit-size corresponding to a sum of the data bit of 1 KB and the ECC bit. The reliability of data stored in the first page may be secured by the ECC block unit. The bit-size of the ECC bit may be ignorable compared with the bit-size of the data bit. Thus, the inventive concept will be described under the assumption that the bit-size of the ECC block is similar to that of the data bit.

Different compressed data may be stored in one page by managing data stored in a cell array 1410 (refer to FIG. 4) by the ECC block unit. This means that a plurality of compressed data can be stored in one physical page.

For example, it is assumed that first compressed data and second compressed data have bit-sizes of 5 KB and 2 KB, respectively. Further, it is assumed that the first compressed data and the second compressed data are collected at a RAM 1340 (refer to FIG. 4) and then programmed into first to seventh ECC blocks of the first page.

Since data is managed by the ECC block unit, compressed data management logic 1370 may know that the first compressed data is stored in the first to fifth ECC blocks of the first page. Further, the compressed data management logic 1370 may know that the second compressed data is stored in the sixth and seventh ECC blocks of the first page.

As described with reference to FIGS. 3 to 5, a flash storage device 1200 according to an embodiment of the inventive concept may be configured to manage compressed data stored in a flash memory by the ECC block unit and to support a 'collective write operation' on compressed data. Thus, the flash storage device 1200 according to an embodiment of the inventive concept may minimize waste of a storage space in the memory cell array 1410.

The bit-size of compressed data can be smaller than that of the ECC block unit. For example, compressed data may have the bit-size of 900 Bytes. Further, the bit-size of compressed data can not exactly correspond to that of the ECC block unit. For example, compressed data may have the bit-size of 1.KB. Nevertheless, the flash storage device 1200 may manage compressed data by the ECC block unit to secure the reliability of data. Thus, compressed data of 900 Bytes may be managed as compressed data corresponding to one ECC block, and compressed data of 1.9 KB may be managed as compressed data corresponding to two ECC blocks.

The flash storage device 1200 and the collective write operation may be variously changed or modified, which will be more fully described below.

Figure 6:
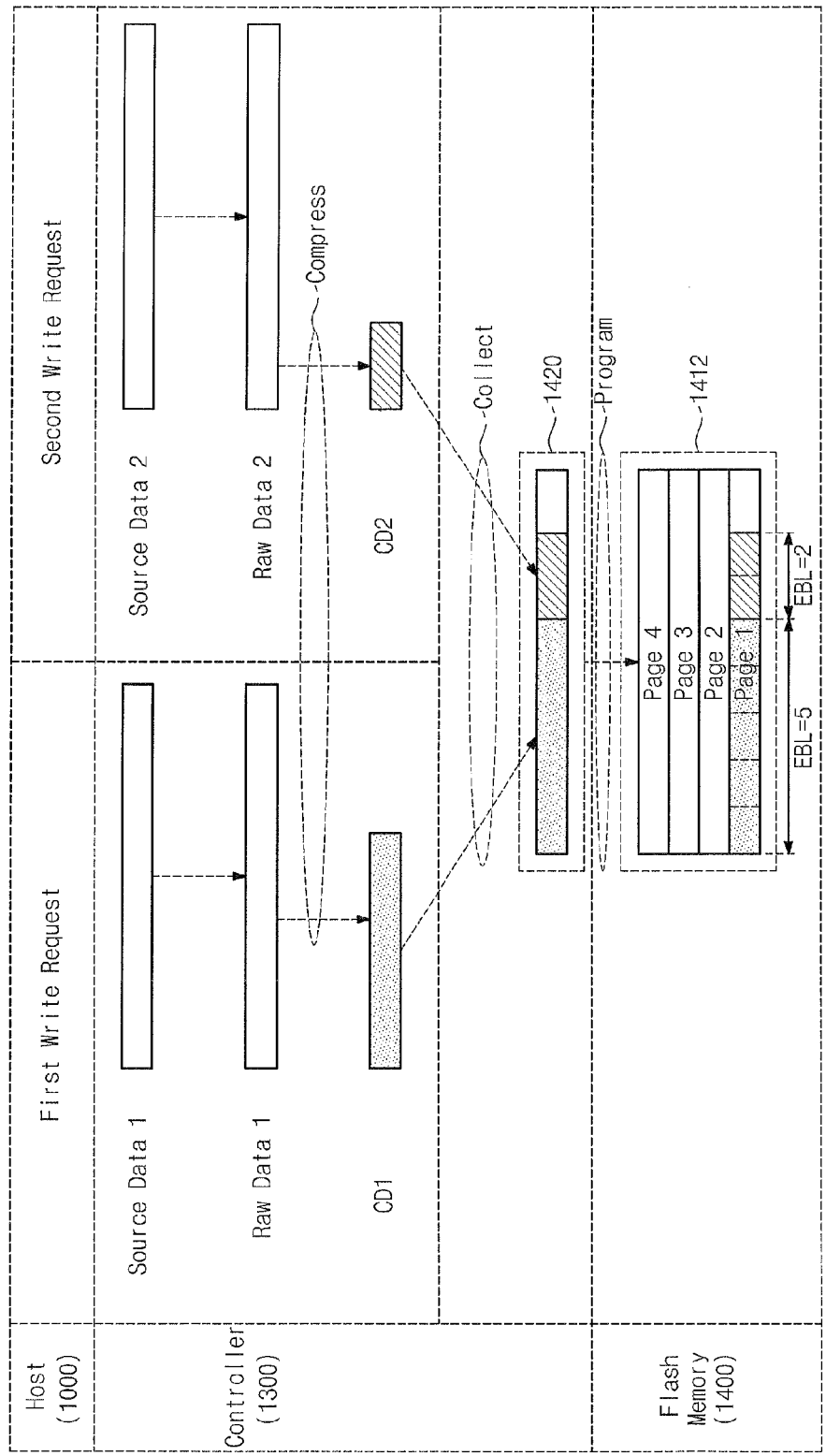

FIGS. 6 to 8 are diagrams illustrating an operation of the flash memory system of FIG. 3. Below, the case that a program operation is executed page by page will be described with reference to FIG. 3.

For ease of description, it is assumed that both the bit-size of a page and the bit-size of a space, allotted to collect compressed data, from among a space of a RAM 1340 are 8 KB. Further, it is assumed that an ECC block unit has the bit-size of 1 KB. A storage device 1200 may sequentially receive a first write request and a second write request from a host 1100.

Referring to FIG. 6, the first write request and first source data may be transferred to a controller 1300 from the host 1100. In response to the first write request, the controller 1300 may compress the first source data to collect the compressed first source data at a RAM 1340. This will be more fully described below.

The first source data may be temporarily stored in the RAM 1340. The first source data may be partitioned according to a compression unit of a compressor 1360 under the control of compressed data management logic 1370 (or, CPU 1330). The partitioned source data corresponding to the compression unit of the compressor 1360 may be referred to as raw data.

For ease of description, it may be assumed that the compression unit of the compressor 1360 matches up to a page unit (i.e., 8 KB) and that the first source data has the bit-size of 8 KB. With this assumption, as illustrated in FIG. 6, the first source data may be converted into first raw data.

Afterwards, the compressor 1360 may compress the first raw data, and an ECC circuit 1350 (refer to FIG. 3) may append an ECC bit to the compressed data. Thus, first compressed data CD1 may be generated. For example, as illustrated in FIG. 6, the first raw data of 8 KB may be converted into the first compressed data CD1 of 5 KB through the compressor 1360. The first compressed data CD1 may be stored in the RAM 1340 under the control of the compressed data management logic 1370.

After the first source data corresponding to the first write request is stored in the RAM 1340, second write request and second source data may be provided to the controller 1300. The second source data may be converted into second raw data in the same manner as the first source data. The compressor 1360 may compress the second raw data, and the ECC circuit 1350 may append an ECC bit to the compressed data. As illustrated in FIG. 6, the second raw data of 8 KB may be converted into the second compressed data CD2 of 2 KB through the compressor 1360. The second compressed data CD2 may be stored in the RAM 1340 under the control of the compressed data management logic 1370.

After sequentially collected at the RAM 1340, the first and second compressed data may be programmed into a cell array 1410. For example, as illustrated in FIG. 6, the first and second compressed data may be programmed into a first page of a memory block 1420.

The compressed data management logic 1370 may update location information associated with the first and second compressed data. For example, as illustrated in FIG. 7, the compressed data management logic 1370 may manage location information of the first and second compressed data by updating a compressed data management table. This will be more fully described below.

As illustrated in FIG. 6, the first compressed data may be programmed into first to fifth ECC blocks of the first page. Herein, it is assumed that a physical address of the first page is '1'. In this case, as illustrated in FIG. 7, the compressed data management logic 1370 may update the compressed data management table such that a physical address PA is set to '1', a start number of an ECC block SNE is set to '1', and the ECC block length EBL is set to '5'. Thus, the compressed data management logic 1370 may exactly know a location of the first compressed data CD 1 corresponding to the first raw data using the compressed data management table.

The second compressed data may be programmed into sixth and seventh ECC blocks of the first page. Thus, as illustrated in FIG. 7, the compressed data management logic 1370 may update the compressed data management table such that a physical address PA is set to '1', a start number of an ECC block SNE is set to '6', and the ECC block length EBL is set to '2'. Thus, the compressed data management logic 1370 may exactly know a location of the second compressed data CD2 corresponding to the second raw data using the compressed data management table.

The compressed data management table in FIG. 7 may be exemplary. However, the inventive concept is not limited thereto. For example, the compressed data management logic 1370 may manage compressed data using a mapping table managed by a flash translation layer without separately generated the compressed data management table. Thus, as illustrated in FIG. 8, the mapping table and the compressed data management table may be unified to form a unified mapping table. In this case, mapping information associated with uncompressed data may be also managed through the unified mapping table. In FIG. 8, compression information CI marked by 'Y' may indicate that data is compressed data, and compression information CI marked by 'N' may indicate that data is uncompressed data. This will be more fully described below.

It may be assumed that a logical address LA of first raw data is '1' and a logical address of second raw data is '2' and that a physical address PA of a first page is '1'.

As illustrated in FIG. 6, the first raw data may correspond to first compressed data, and the first compressed data may be programmed into first to fifth ECC blocks of the first page. Afterwards, as illustrated in FIG. 8, the compressed data management logic 1370 may update the compressed data management table such that such that a logical address LA is set to '1', a physical address PA is set to '1', a start number of an ECC block SNE is set to '1', and the ECC block length EBL is set to '5'. Thus, it is understood that data (i.e., the first raw data) corresponding to the logical address LA of 1 is stored in first to fifth ECC blocks of the first page. Also, the compressed data management logic 1370 may update the compression information CI to be set to 'Y'. Thus, it is understood that data (i.e., the first raw data) corresponding to the logical address LA of 1 is stored in a compressed state.

Likewise, as illustrated in FIG. 6, the second raw data may correspond to second compressed data, and the second compressed data may be programmed into sixth and seventh ECC blocks of the first page. Thus, as illustrated in FIG. 8, the compressed data management logic 1370 may update the compressed data management table such that such that a logical address LA is set to '2', a physical address PA is set to '1', a start number of an ECC block SNE is set to '6', and the ECC block length EBL is set to '2'. Thus, it is understood that data (i.e., the second raw data) corresponding to the logical address LA of 2 is stored in the sixth and seventh ECC blocks of the first page. Also, the compressed data management logic 1370 may update the compression information CI to be set to 'Y'. Thus, it is understood that data (i.e., the second raw data) corresponding to the logical address LA of 2 is stored in a compressed state.

As described with reference to FIGS. 6 to 8, a flash storage device 1200 according to an embodiment of the inventive concept may manage compressed data by the ECC block unit using a compressed data management table or a unified mapping table. Thus, the flash storage device 1200 may minimize waste of a storage space of a cell array 1410 by storing plural compressed data at one page.

Figure 9:
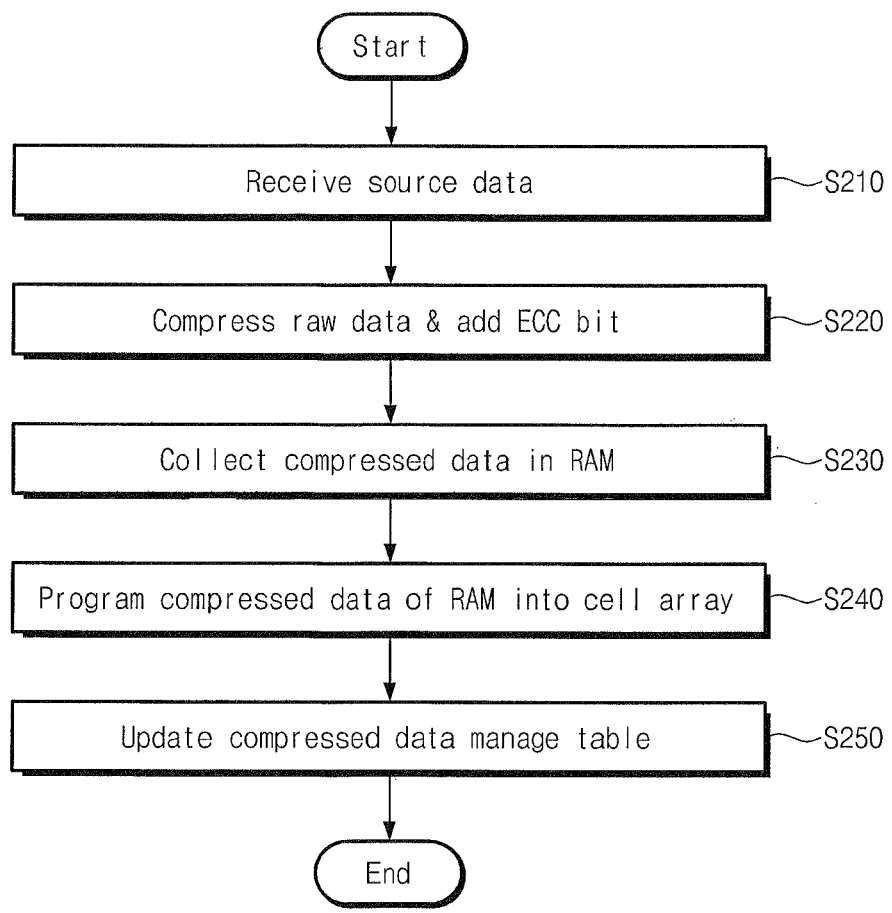
FIG. 9 is a flowchart illustrating the method of operation of the flash memory system described in FIGS. 6 to 8.

FIG. 9 is a flowchart illustrating a method of operation of the flash memory system described in FIGS. 6 to 8.

In step S210, a flash storage device 1200 may receive source data. If the bit-size of the source data is different from a compress unit of a compressor 1360, the source data may be partitioned according to the compression unit under the control of compressed data management logic 1370 (or, CPU 1330).

In step S220, raw data may be compressed, and an ECC bit may be added to the compressed data. Herein, the raw data may mean source data matching up to the compression unit. Thus, a compressor 1360 may compress the source data (or, raw data partitioned according to the compression unit), and an ECC circuit 1350 may add the ECC bit to the compressed data. Thus, compressed data may be generated.

In step S230, the compressed data may be collected at a RAM 1340. For example, as described with reference to FIGS. 6 to 8, different data compressed by the compressor 1360 may be collected at the RAM 1340.

In step S240, compressed data collected at the RAM 1340 may be programmed into the cell array 1410. For example, in the event that a plurality of compressed data is collected at the RAM 1340, the plurality of compressed data may be programmed into the same page of the cell array 1410.

In step S250, a compressed data management table may be updated. Thus, compressed data management logic 1370 may manage data stored in the cell array 1410 by an ECC block unit using a compressed data management table, and may update the compressed data management table to include location information of newly programmed compressed data.

An operating method of the flash memory system 1000 described in FIG. 9 may be exemplary. However, the inventive concept is not limited thereto. For example, after compressed data collected at the RAM 1340 is programmed into the cell array 1410 (S240), the compressed data management table may be updated (S250). As another example, after the compressed data management table is updated, compressed data collected at the RAM 1340 may be programmed into the cell array 1410.

Figure 10:
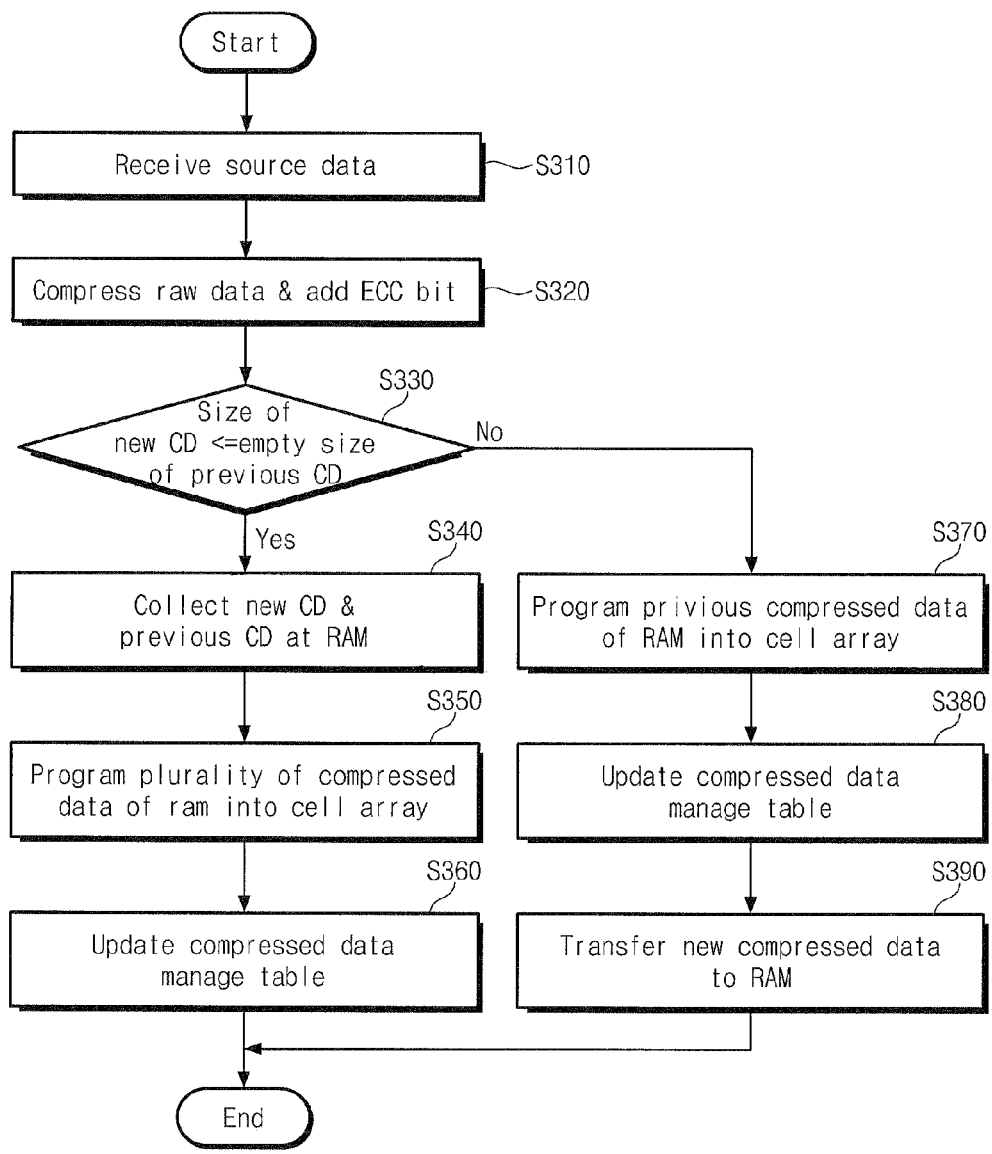
FIG. 10 is a flowchart illustrating a method of operation of the flash memory system in FIG. 3 according to another embodiment of the inventive concept.

FIG. 10 is a flowchart illustrating a method of operation of the flash memory system in FIG. 3 according to another embodiment of the inventive concept. An operation of a flash memory system 1000 in FIG. 10 may be analogous to that described with reference to FIGS. 6 to 9, and a difference therebetween will be described.

For ease of description, it may be assumed that data compressed by a compressor 1360 according to a previous write request is referred to as previous compressed data and data compressed by a compressor 1360 according to a current write request is referred to as new compressed data. Also, it is assumed that the bit-size of the RAM 1340 for collecting compressed data matches up to the bit-size of the program unit (e.g., one or more page size) (e.g., one page having 8 KB).

In step S310, source data may be transferred to a flash storage device 1200.

In step S320, the compressor 1360 may compress raw data, and an ECC circuit 1350 may add an ECC bit to the compressed data. Thus, new compressed data may be generated.

In step S330, compressed data management logic 1370 may compare the bit-size of the compressed data with the bit-size of an empty region. Herein, the empty region indicates the difference between the bit-size of data to be programmed simultaneously and the bit-size of previous compressed data collected at a RAM 1340. For example, as described with reference to FIGS. 6 to 9, in a case where a program operation is executed page by page, an empty region corresponds to the difference between the page bit-size and the bit-size of previous compressed data collected at the RAM 1340. For example, when a page bit-size is 8 KB and the bit-size of previous compressed data collected at the RAM 1340 is 5 KB, the bit-size of the empty region may be 3 KB.

If the bit-size of new compressed data is smaller than or equal to the bit-size of the empty region, in step S340, the new compressed data may be collected at the RAM 1340. In step S350, the new compressed data and the previous compressed data collected at the RAM 1340 may be programmed into the same page. In step S360, the compressed data management logic 1370 may update a compressed data management table (or, a unified mapping table).

If the bit-size of new compressed data is larger than the bit-size of the empty region, in step S370, the previous compressed data stored in the RAM 1340 may be programmed into a predetermined page of the cell array 1410. In step S380, the compressed data management logic 1370 may update the compressed data management table (or, unified mapping table). In step S390, new compressed data may be collected at the RAM 1340.

As described above, a flash memory system 1000 according to an embodiment of the inventive concept may determine a collective write operation, based on a comparison result between the bit-size of compressed data and an empty region of a page buffer 1420.

An operation of a flash memory system is described under the condition that the bit-size of the RAM 1340 for collecting compressed data matches up to the program unit (one or more page size). However, the inventive concept is not limited thereto. The inventive concept may be changed or modified variously. For example, the bit-size of the RAM 1340 can be larger than the program unit. Below, the inventive concept will be described under the condition that the bit-size of the RAM 1340 is larger than the program unit.

Figure 11:
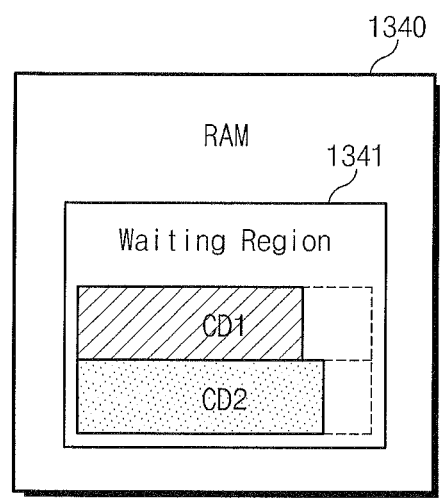
FIG. 11 is a diagram illustrating a RAM (random access memory) according to an embodiment of the inventive concept.

FIG. 11 is a diagram illustrating a random access memory (RAM) according to an embodiment of the inventive concept. Referring to FIG. 11, a portion of an RAM 1340 may be allotted as a waiting region 1341, and the waiting region 1341 may temporarily store previous compressed data. For example, the case that first previous compressed data CD1 and second previous compressed data CD2 are temporarily stored in the waiting region 1341 is illustrated in FIG. 11.

In exemplary embodiments, compressed data management logic 1370 may compare the bit-size of new compressed data with the bit-size of an empty region of each previous compressed data stored in the waiting region 1341. If the bit-size of new compressed data is smaller than the bit-size of an empty region of any one of previous compressed data, the new compressed data and the selected previous compressed data may be programmed into a page at the same time.

Herein, the new compressed data may be data compressed by the compressor 1360 according to a current write request, and the previous compressed data may be data compressed by the compressor 1360 according to a previous write request. An empty region of previous compressed data corresponds to the difference between the bit-size of data capable of being programmed at the same time (i.e., the program unit and the bit-size of previous compressed data.

For example, in the event that a program operation is executed page by page, an empty region of previous compressed data means the difference between a page bit-size and the bit-size of previous compressed data. For example, when the page bit-size is 8 KB and the bit-size of first previous compressed data CD1 is 5 KB, an empty region of the first previous compressed data is 3 KB.

Figure 12:
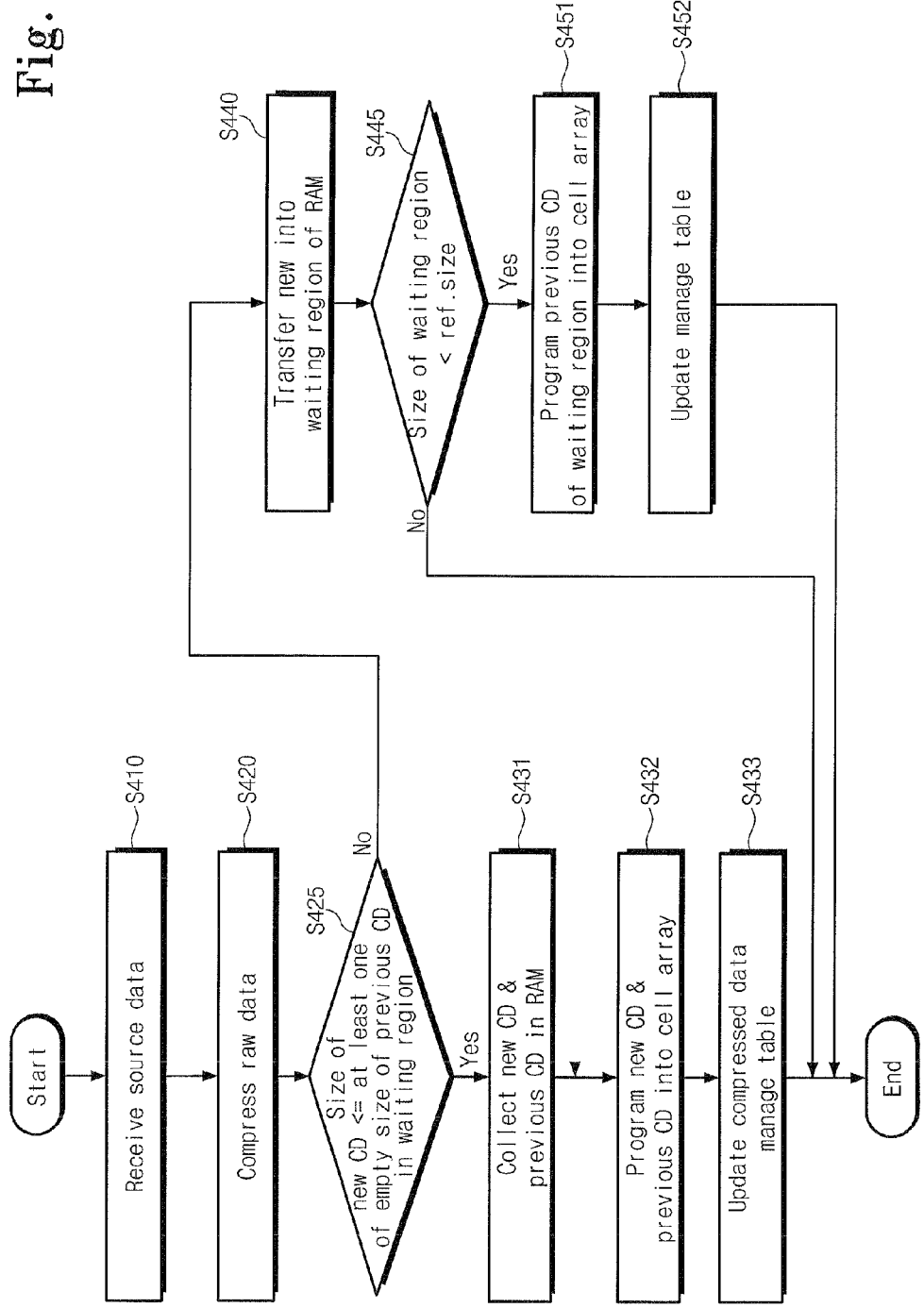
FIG. 12 is a flowchart illustrating a method of operation of the flash memory system of FIG. 3 according to still another embodiment of the inventive concept.

FIG. 12 is a flowchart illustrating a method of operation of the flash memory system of FIG. 3 according to still another embodiment of the inventive concept. As illustrated in FIG. 11, a RAM 1340 of a flash memory system 1000 includes a waiting region 1341. An operation of a flash memory system 1000 in FIG. 12 may be analogous to that described with reference to FIG. 10, and the difference therebetween will be described.

In step S410, source data may be transferred to a flash storage device 1200.

In step S420, a compressor 1360 compresses raw data, and an ECC circuit 1350 adds an ECC bit to the compressed data. Thus, new compressed data may be generated.

In step S425, compressed data management logic 1370 compares the bit-size of new compressed data with the bit-size of an empty region of at least one compressed data stored in the waiting region 1341. For example, as illustrated in FIG. 11, in the event that two previous compressed data CD1 and CD2 are stored in the waiting region 1341, the compressed data management logic 1370 may compare the bit-size of new compressed data with the bit-size of an empty region of each of the first and second previous compressed data CD1 and CD2.

If the bit-size of the new compressed data is smaller than the bit-size of an empty region of any one of a plurality of previous compressed data stored in the waiting region 1341, the new compressed data and corresponding previous compressed data may be collected at the RAM 1340. Afterwards, in step S432, the new and previous compressed data collected at the RAM 1340 may be programmed into a page of a cell array 1410. In step S4330, the compressed data management logic 1370 may update a compressed data management table (or, a unified mapping table).

If the bit-size of the new compressed data is larger than bit-sizes of empty regions of all previous compressed data stored in the waiting region 1341, in step S440, the new compressed data may be transferred to the waiting region 1341. In step S445, the compressed data management logic 1370 may compare the bit-size of compressed data stored in the waiting region 1341 with a reference bit-size ref.bit-size.

If the bit-size of compressed data stored in the waiting region 1341 is larger than the reference bit-size ref.bit-size, the compressed data management logic 1370 may execute a series of operations for reducing the bit-size of the waiting region 1341. In particular, in step S451, predetermined compressed data of previous compressed data stored in the waiting region 1341 may be programmed into the cell array 1410. In step S452, the compressed data management table (or, unified mapping table) may be updated.

If the bit-size of compressed data stored in the waiting region 1341 is smaller than the reference bit-size ref.bit-size, the flash storage device 1200 may maintain a waiting state to receive a next program command.

As described above, a flash memory system 1000 according to an embodiment of the inventive concept may compare the bit-size of new compressed data with bit-sizes of empty regions of previous compressed data stored in the waiting region 1341 and determine an optimal collective write operation according to a comparison result. Also, when the bit-size of the waiting region 1341 is larger than a reference bit-size, there may be executed a series of operations to reduce the bit-size of the waiting region 1341.

Figure 13:
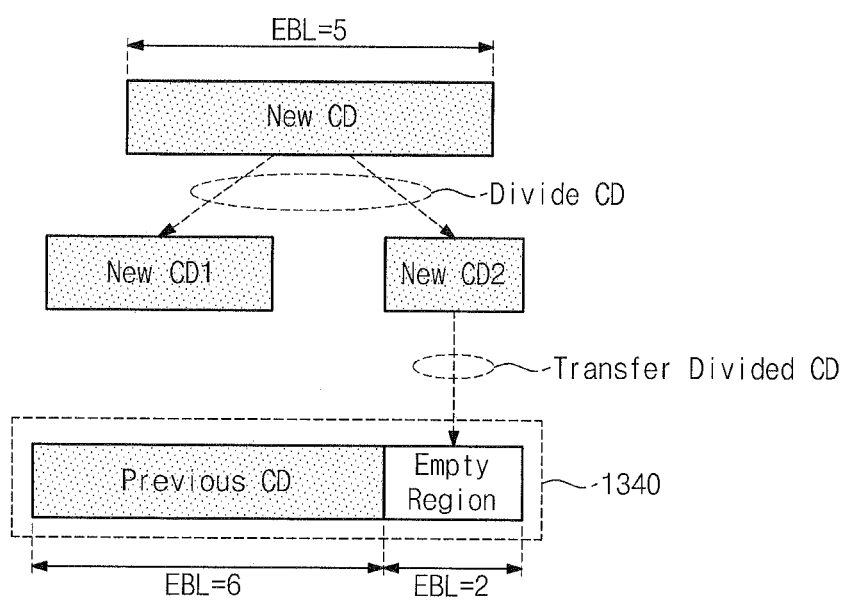
FIG. 13 is a diagram illustrating an operation of the flash memory system of FIG. 3 according to still another embodiment of the inventive concept.

FIG. 13 is a diagram illustrating an operation of the flash memory system of FIG. 3 according to still another embodiment of the inventive concept. When the bit-size of new compressed data is larger than the bit-size of an empty region, compressed data management logic 1370 according to an embodiment of the inventive concept may measure the bit-size of the empty region and divide the new compressed data based on the measured bit-size.

Herein, the empty region may mean a difference between the bit-size of simultaneously programmed data (i.e., the program unit and the bit-size of compressed data collected at a RAM 1340. For example, as described with reference to FIGS. 6 to 9, when a program operation is executed page by page, an empty region may mean a difference between a page bit-size and the bit-size of compressed data collected at the RAM 1340.

For ease of description, as illustrated in FIG. 13, it may be assumed that the ECC block length EBL of new compressed data is '5' and that the ECC block length EBL of an empty region of the RAM 1340 is '2'. With this assumption, the compressed data management logic 1370 may divide the new compressed data into first new compressed data having the ECC block length EBL of 3 and second new compressed data having the ECC block length EBL of '2'. Afterwards, previous compressed data and the second new compressed data may be programmed under the control of the compressed data management logic 1370.

Figure 14:
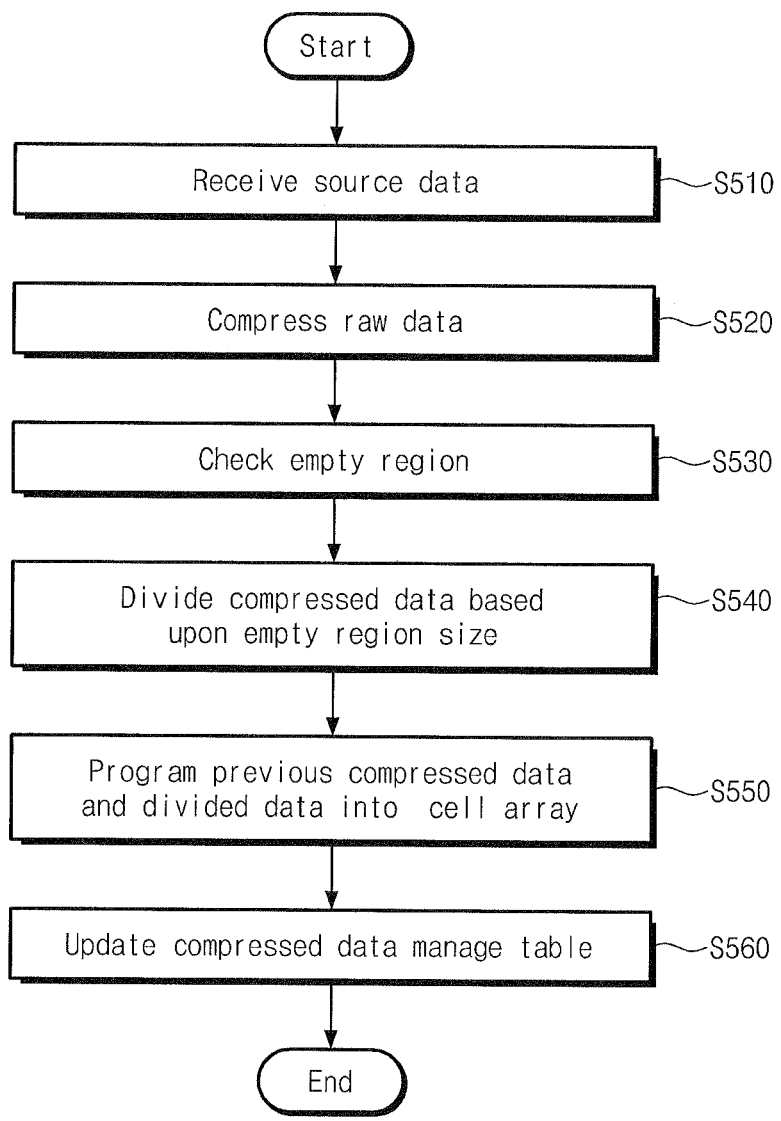
FIG. 14 is a flowchart illustrating a method of operation of the flash memory system of FIG. 3 according to still another embodiment of the inventive concept.

FIG. 14 is a flowchart illustrating a method of operation of the flash memory system of FIG. 3 according to still another embodiment of the inventive concept. An operation of a flash memory system 1000 in FIG. 14 may be analogous to that described with reference to FIG. 10, and a difference therebetween will be described.

In step S510, source data may be transferred to a flash storage device 1200. In step S520, a compressor 1360 may compress raw data, and an ECC circuit 1350 may add an ECC bit to the compressed data. Thus, compressed data may be generated.

In step S530, compressed data management logic 1370 may check the bit-size of an empty region. In step S540, the compressed data management logic 1370 may divide compressed data according to the bit-size of the empty region. In step S550, a selected on of the divided compressed data and previous compressed data may be programmed into the cell array 1410. In step S560, a compressed data management table (or, a unified mapping table) may be updated.

As described above, a flash memory system 1000 according to an embodiment of the inventive concept may divide compressed data according to an empty region of a page buffer 1420 to perform a collective write operation. However, the inventive concept is not limited thereto. For example, a cell array 1410 of a flash memory system 1000 includes a plurality of planes, and a plurality of pages may be programmed at the same time.

In a case where a plurality of pages may be programmed at the same time, a set of pages programmed at the same time may be referred to as a super page. Below, a program operation executed by a super page will be more fully described.

Figure 15:
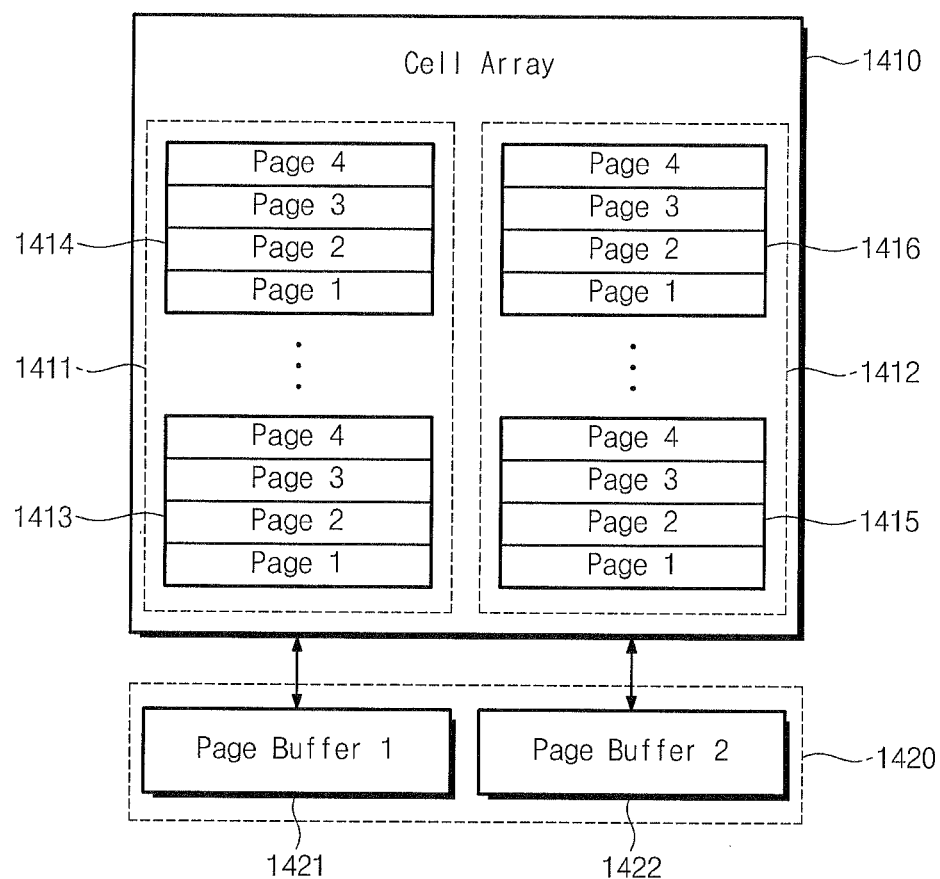
FIG. 15 is a block diagram of a cell array in the flash memory system of FIG. 3 according to another embodiment of the inventive concept.

FIG. 15 is a block diagram of a cell array in the flash memory system of FIG. 3 according to another embodiment of the inventive concept. Unlike a cell array in FIG. 4, a cell array 1410 in FIG. 15 includes a plurality of planes. For ease of illustration, in FIG. 15, there may be illustrated the case that the cell array 1410 includes two planes. However, the inventive concept is not limited thereto. For example, the cell array 1410 may be configured to include three or more planes.

Referring to FIG. 15, the cell array 1410 includes first and second planes 1411 and 1412. Each of the first and second planes 1411 and 1412 includes a plurality of memory blocks each having a plurality of pages.

A page buffer block 1420 includes first and second page buffers 1421 and 1422. The first page buffer 1421 may correspond to a first plane 1411. The first page buffer 1421 may be configured to temporarily store data to be programmed into a page of the first plane 1411 or data read out from a page of the first plane 1411. The second page buffer 1422 may correspond to a second plane 1412. The second page buffer 1422 may be configured to temporarily store data to be programmed into a page of the second plane 1412 or data read out from a page of the second plane 1412.

When a program operation is executed, data in the first page buffer 1421 and data in the second page buffer 1422 may be programmed into the cell array 1410 at the same time. Thus, two pages of the cell array 1410 may be programmed at the same time. In this case, the program unit (e.g., one or more page size) may correspond to the sum of bit-sizes of two pages.

The inventive concept may be also applied to the case that a plurality of pages is programmed at the same time. Thus, in the event that a plurality of pages is programmed at the same time, compressed data management logic 1370 according to an embodiment of the inventive concept may manage data stored in the cell array 1410 by an ECC block unit and control a flash memory 1400 such that a plurality of compressed data is programmed at the same time through the first and second page buffers 1421 and 1422.

Figure 16:
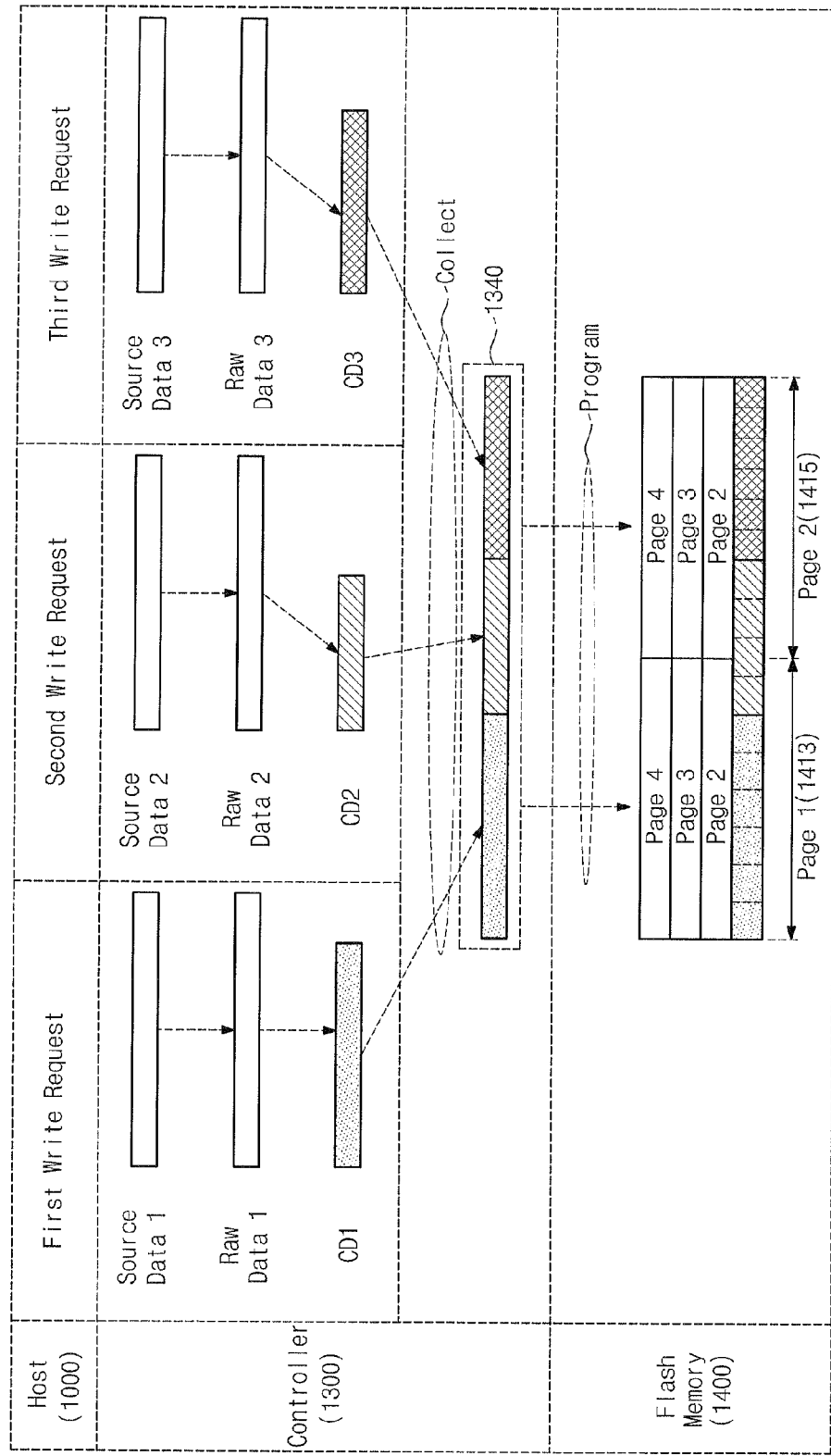
FIGS. 16 and 17 are diagrams illustrating an operation of the flash memory system of FIG. 1 when a plurality of pages is simultaneously programmed.
Figures 17, 18:
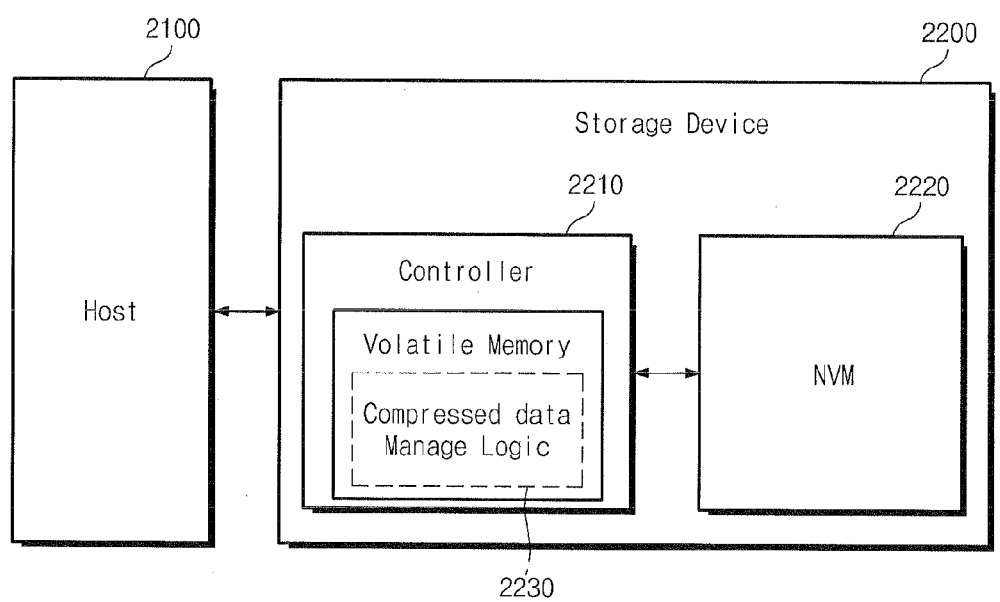
FIGS. 18 to 20 are block diagrams illustrating various applications of a memory system according to an embodiment of the inventive concept.

FIGS. 16 and 17 are diagrams illustrating an operation of the flash memory system of FIG. 1 when a plurality of pages is simultaneously programmed. In FIGS. 16 and 17, an operation of a flash memory system may be performed similar to that described with reference to FIGS. 6 and 7, and a difference therebetween will be described.

For ease of description, there may be assumed that first to third write requests are sequentially provided to a controller 1300 from a host 1100, that a page bit-size and a page buffer bit-size are 8 KB, that the bit-size of a RAM 1340 for collecting compressed data is 16 KB, and that two pages are simultaneously programmed.

Referring to FIG. 16, a first write request and first source data may be transferred to the controller 1300 from the host 1100. The controller 1300 may partition the first source data according to a compression unit of a compressor 1360. For ease of description, it may be assumed that the first source data and first raw data have the bit-size of 8 KB, respectively.

Afterwards, the compressor 1360 may compress the first raw data to generate first compressed data CD1. For example, as illustrated in FIG. 16, the first compressed data CD1 of 6 KB may be generated by compressing the first raw data of 8 KB. The first compressed data CD1 may be collected at a RAM 1340 under the control of compressed data management logic 1370.

After the first compressed data CD1 is collected at the RAM 1340, a second write request and second source data may be provided to the controller 1300. The second source data may be compressed to generate second compressed data CD2 in the same manner as the first source data. For example, as illustrated in FIG. 16, the second compressed data CD2 may have the bit-size of 4 KB, and may be collected at the RAM 1340.

Then, a third write request and third source data may be provided to the controller 1300. The third source data may be compressed to generate third compressed data CD3 in the same manner as the first source data. For example, as illustrated in FIG. 16, the third compressed data CD3 may have the bit-size of 6 KB, and may be collected at the RAM 1340.

After collected at the RAM 1340, the first to third compressed data CD 1 to CD3 may be simultaneously programmed into the cell array 1410 through a page buffer block 1420 (refer to FIG. 15). For example, as illustrated in FIG. 16, the first to third compressed data CD 1 to CD3 may be simultaneously programmed into a first page of a memory block 1413 and a first page of a memory block 1415.

Afterwards, compressed data management logic 1370 may update location information of the first to third compressed data CD 1 to CD3. For example, as illustrated in FIG. 17, the compressed data management logic 1370 may update a unified mapping table.

In particular, referring to FIG. 16, the first compressed data CD 1 may be stored in first to sixth ECC blocks of a first page. Thus, in the event that a physical address PA of the first page is '1', as illustrated in FIG. 17, the compressed data management logic 1370 may update the unified mapping table such that a physical address PA is set to '1', a start number of ECC block SNE is set to '1', and the ECC block length EBL is set to '6'.

Also, referring to FIG. 16, the second compressed data CD2 may be stored in seventh and eighth ECC blocks of the first page and at first and second ECC block of a second page, and may have the ECC block length EBL of '4'. As illustrated in FIG. 17, the compressed data management logic 1370 may update the unified mapping table such that a physical address PA is set to '1', a start number of ECC block SNE is set to '7', and the ECC block length EBL is set to '4'.

Likewise, the compressed data management logic 1370 may update location information of the third compressed data CD3 (i.e., the unified mapping table) such that a physical address PA is set to '2', a start number of ECC block SNE is set to '3', and the ECC block length EBL is set to '6'.

Upon read request on first to third raw data, the compressed data management logic 1370 may refer to the unified mapping table to exactly find locations where the first to third raw data is stored.

Figure 19:
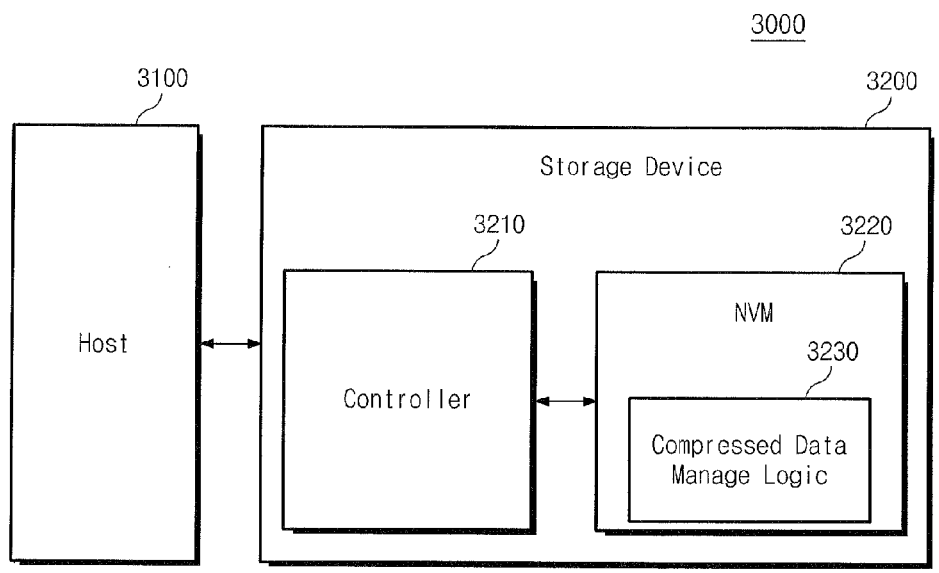
Figure 20:
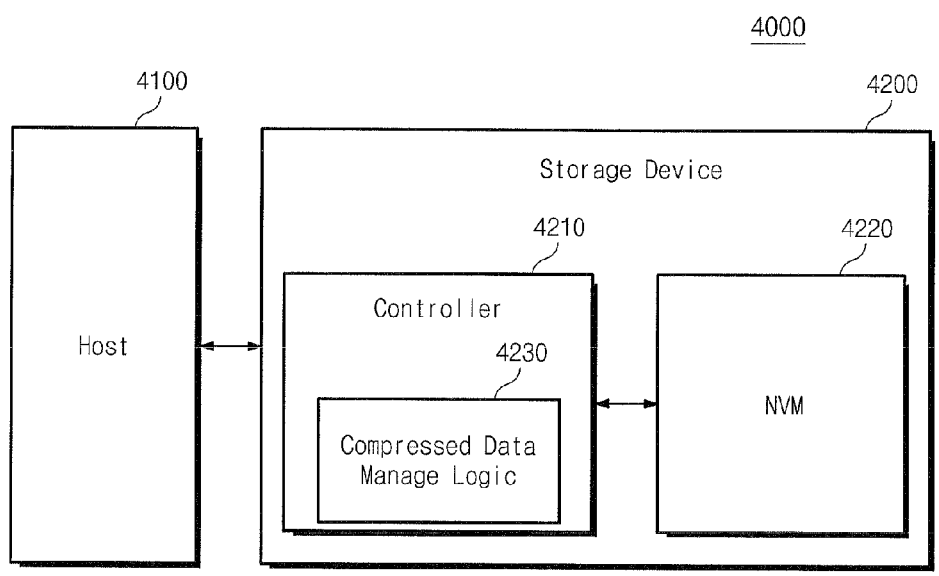

FIGS. 18 to 20 are block diagrams illustrating various applications of a memory system according to an embodiment of the inventive concept. Referring to FIGS. 18 to 20, a memory system 2000/300/4000 includes a host 2100/3100/4100 and a storage device 2200/3200/4200. The storage device 2200/3200/4200 includes a controller 2210/3210/4210 and a nonvolatile memory 2220/3220/4220.

The storage device 2200/3200/4200 includes a memory card (e.g., SD, MMC, etc.) or a storage medium such as an attachable mobile storage device (e.g., USB memory, etc.). The storage device 2200/3200/4200 may be connected with a host 2100/3100/4100. The storage device 2200/3200/4200 may exchange data with the host 2100/3100/4100 through a host interface. The storage device 2200/3200/4200 may be powered by the host 2100/3100/4100.

Referring to FIG. 18, compressed data management logic 2230 may be formed of software S/W or firmware, not hardware H/W. The compressed data management logic 2230 may be driven on a volatile memory. Referring to FIG. 19, the compressed data management logic 2230 may be implemented to be included within the storage medium 3220. Referring to FIG. 20, a compressor 4240 may be provided within the host 4100, and a controller 4210 may receive compressed data.

The memory system 2000/3000/4000 according to an embodiment of the inventive concept may manage data stored in a nonvolatile memory 2200/3200/4200 by an ECC block unit and support a collective write operation for compressed data. Thus, it is possible to use a storage space of the storage medium 2220/3200/4200 efficiently.

Figure 21:
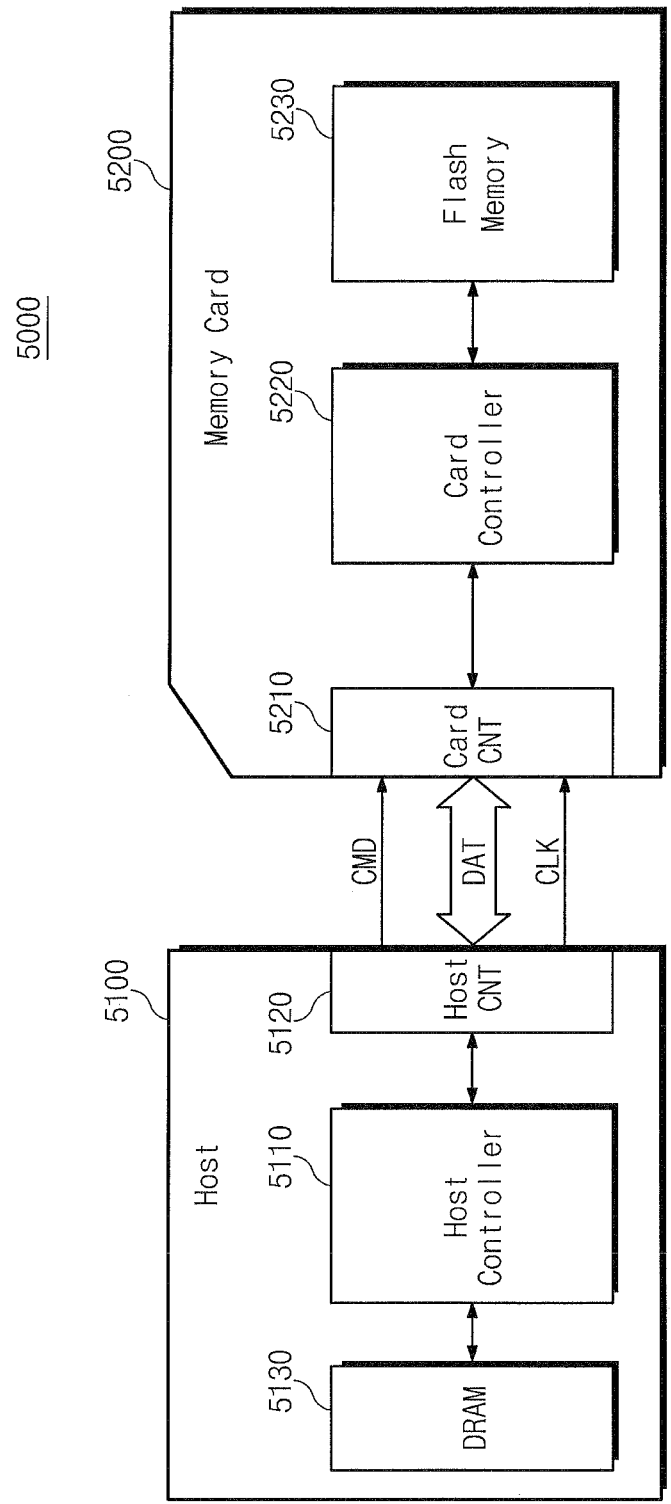
FIG. 21 is a block diagram of a memory card system to which a flash memory system according to an embodiment of the inventive concept is applied.

FIG. 21 is a block diagram of a memory card system to which a flash memory system according to an embodiment of the inventive concept is applied. A memory card system 5000 includes a host 5100 and a memory card 5200. The host 5100 includes a host controller 5110, a host connection unit 5120, and a DRAM 5130.

The host 5100 may write data in the memory card 5200 and read data from the memory card 5200. The host controller 5110 may send a command (e.g., a write command), a clock signal CLK generated from a clock generator (not shown) in the host 5100, and data to the memory card 5200 via the host connection unit 5120. The DRAM 5130 may be a main memory of the host 2100.

The memory card 5200 includes a card connection unit 5210, a card controller 5220, and a flash memory 5230. The card controller 5220 may store data in the flash memory 2230 in response to a command input via the card connection unit 5210. The data may be stored in synchronization with a clock signal generated from a clock generator (not shown) in the card controller 5220. The flash memory 5230 may store data transferred from the host 5100. For example, in a case where the host 5100 is a digital camera, the flash memory 5230 may store image data.

In the memory card system 5000 in FIG. 21, the card controller 5220 includes compressed data management logic and a compressor which are provided within the host controller 5110, the card controller 5220, or the flash memory 5230. As described above, it is possible to a storage space efficiently by managing data by an ECC block unit and supporting a collective write operation for compressed data.

Figure 22:
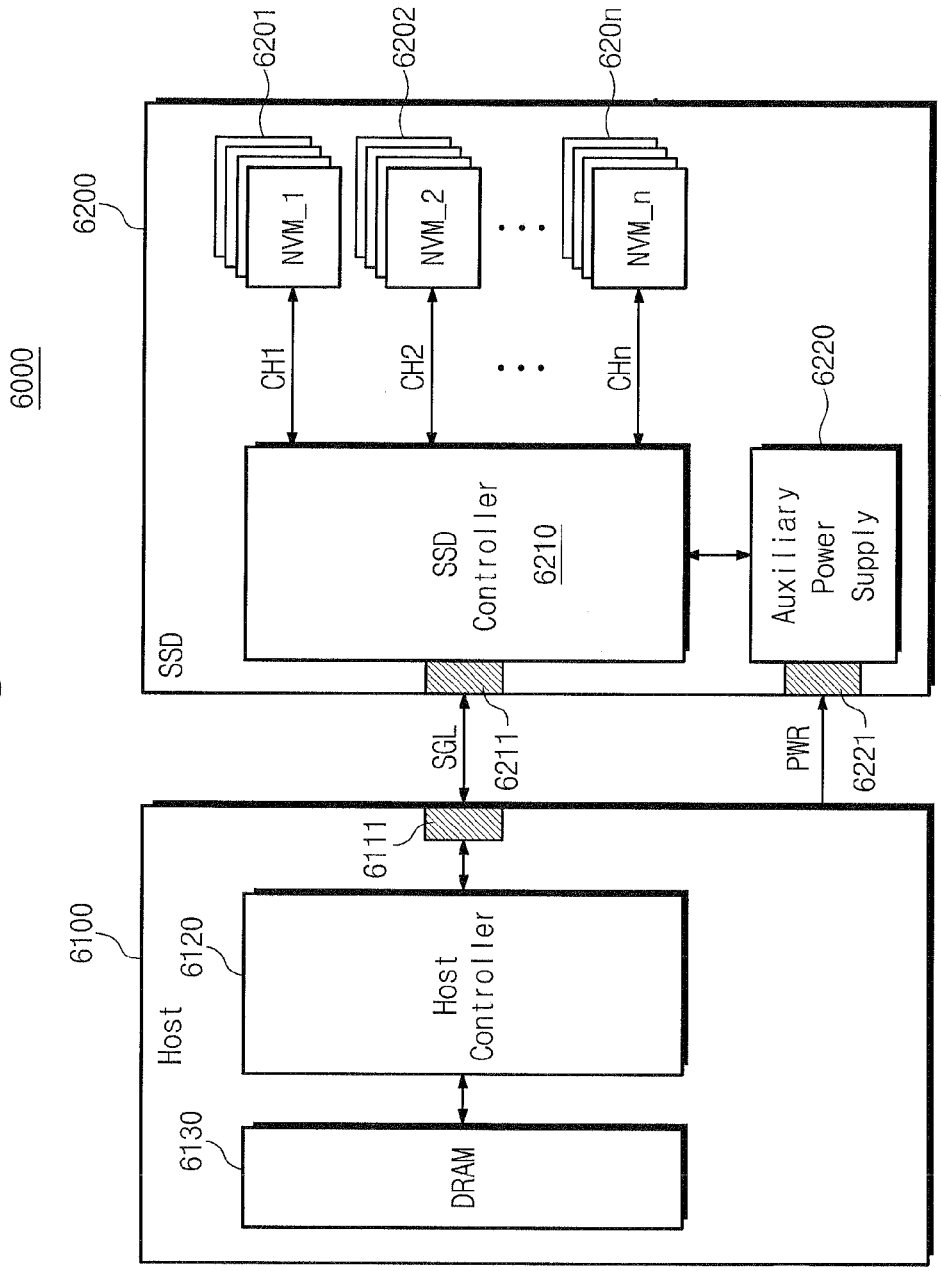
FIG. 22 is a block diagram of a solid state drive system in which a memory system according to the inventive concept is applied.

FIG. 22 is a block diagram of a solid state drive system in which a memory system according to the inventive concept is applied. Referring to FIG. 22, a solid state drive (SSD) system 6000 includes a host 6100 and an SSD 6200. The host 6100 includes a host interface 6111, a host controller 6120, and a DRAM 6130.

The host 6100 may write data in the SSD 6200 or read data from the SSD 6200. The host controller 6120 may transfer signals SGL such as a command, an address, a control signal, and the like to the SSD 6200 via the host interface 6111. The DRAM 6130 may be a main memory of the host 6100.

The SSD 6200 may exchange signals SGL with the host 6100 via the host interface 6211, and may be supplied with a power via a power connector 6221. The SSD 6200 includes a plurality of nonvolatile memories 6201 through 620n, an SSD controller 6210, and an auxiliary power supply 6220. Herein, the nonvolatile memories 6201 to 620n may be implemented by not only a NAND flash memory but also nonvolatile memories such as PRAM, MRAM, ReRAM, and the like.

The plurality of nonvolatile memories 6201 through 620n may be used as a storage medium of the SSD 6200. The plurality of nonvolatile memories 6201 to 620n may be connected with the SSD controller 6210 via a plurality of channels CH1 to CHn. One channel may be connected with one or more nonvolatile memories. Nonvolatile memories connected with one channel may be connected with the same data bus.

The SSD controller 6210 may exchange signals SGL with the host 6100 via the host interface 6211. Herein, the signals SGL includes a command, an address, data, and the like. The SSD controller 6210 may be configured to write or read out data to or from a corresponding nonvolatile memory according to a command of the host 6100. The SSD controller 6210 will be more fully described with reference to FIG. 23.

The auxiliary power supply 6220 may be connected with the host 6100 via the power connector 6221. The auxiliary power supply 6220 may be charged by a power PWR from the host 6100. The auxiliary power supply 6220 may be placed inside or outside the SSD 3200. For example, the auxiliary power supply 6220 may be put on a main board to supply the auxiliary power to the SSD 6200.

Figure 23:
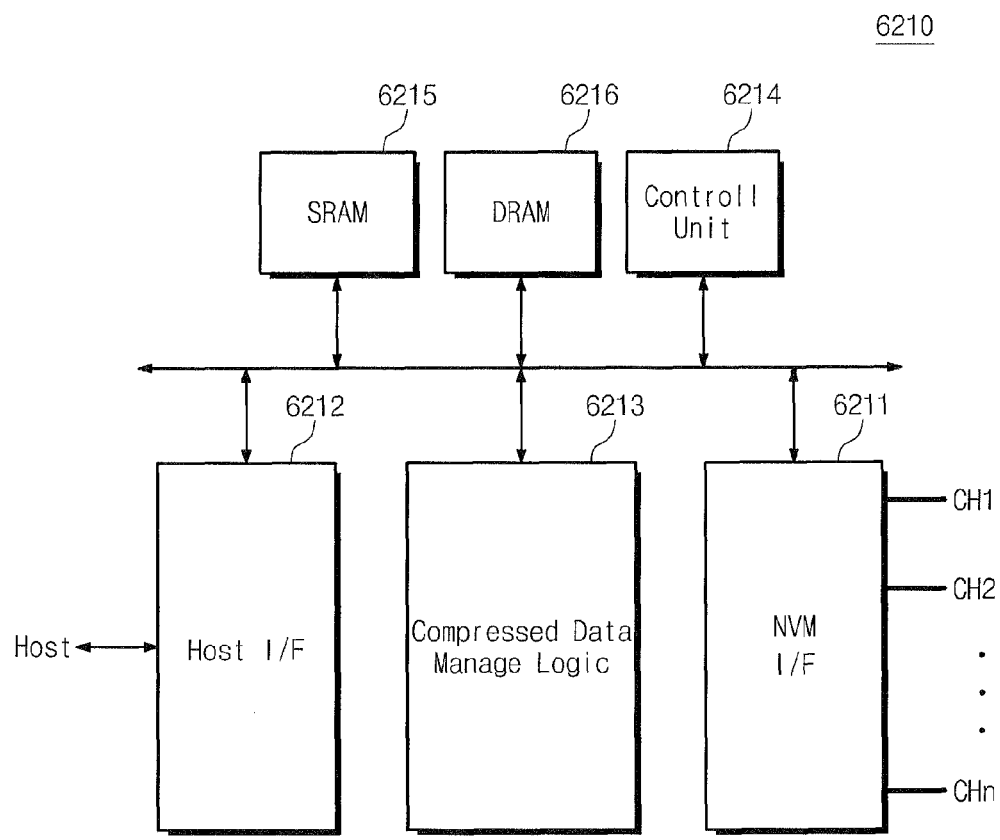
FIG. 23 is a block diagram of the SSD controller in the solid state drive system of FIG. 22.

FIG. 23 is a block diagram of the SSD controller in the solid state drive system of FIG. 22. Referring to FIG. 23, an SSD controller 6210 includes an NVM interface 6211, a host interface 6212, compressed data management logic 6213, a control unit 6214, an SRAM 6215, and a DRAM 6216.

The NVM interface 6211 may scatter data transferred from a main memory of a host 6100 to channels CH1 to CHn, respectively. The NVM interface 6211 may transfer data read from nonvolatile memories 6201 to 620n to the host 6100 via the host interface 6212.

The host interface 6212 may provide an interface with an SSD 6200 according to the protocol of the host 6100. The host interface 6212 may communicate with the host 6100 using USB (Universal Serial Bus), SCSI (Small Computer System Interface), PCI express, ATA, PATA (Parallel ATA), SATA (Serial ATA), SAS (Serial Attached SCSI), etc. The host interface 6212 may perform a disk emulation function which enables the host 6100 to recognize the SSD 6200 as a hard disk drive (HDD).

The compressed data management logic 6213, as described above, may manage data stored in the nonvolatile memories 6201 to 620n by an ECC block unit and support a collective write operation for compressed data. The control unit 6214 may analyze and process a signal input from the host 6100. The control unit 6214 may control the host 6100 through the host interface 6212 or the nonvolatile memories 6201 to 620n through the NVM interface 6211. The control unit 6214 may control the nonvolatile memories 6201 to 620n according to firmware for driving the SSD 6200.

The SRAM 6215 may be used to drive software which efficiently manages the nonvolatile memories 6201 to 620n. The SRAM 6315 may store metadata input from a main memory of the host 6100 or cache data. At a sudden power-off operation, metadata or cache data stored in the SRAM 6215 may be stored in the nonvolatile memories 6201 to 620n using an auxiliary power supply 6220.

The DRAM 6216 may temporarily store compressed data and provide a space for collecting compressed data. Also, as described above, a portion of the DRAM 6216 may be set to a waiting region. Returning to FIG. 22, an SSD system 600 may a storage space efficiently by managing data by an ECC block unit and supporting a collective write operation for compressed data.

The DRAM 6216 may be placed within the SSD controller 6210. However, the inventive concept is not limited thereto. For example, the DRAM 6216 may be implemented to be located outside the SSD controller 6210. In FIGS. 22 and 23, the SRAM 6215 and the DRAM 6216 can be replaced with a nonvolatile memory. Thus, the SSD system 6000 may be configured such that nonvolatile memories (e.g., PRAM, RRAM, MRAM, and the like) perform roles of the SRAM 6215 and the DRAM 6216.

Figure 24:
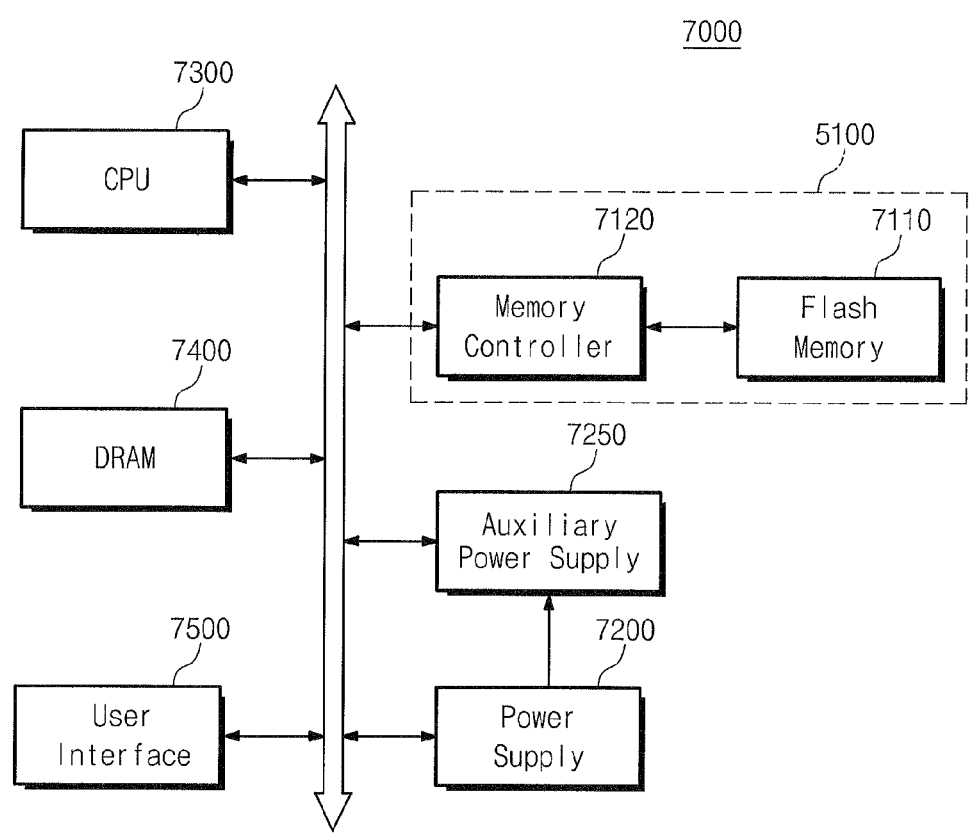
FIG. 24 is a block diagram of an electronic device including a flash memory system according to an embodiment of the inventive concept.

FIG. 24 is a block diagram of an electronic device including a flash memory system according to an embodiment of the inventive concept. Herein, an electronic device 7000 may be a personal computer or a handheld electronic device such as a notebook computer, a cellular phone, a PDA, a camera, and the like.

Referring to FIG. 24, the electronic device 7000 includes a memory system 7100, a power supply device 7200, an auxiliary power supply 7250, a CPU 7300, a DRAM 7400, and a user interface 7500. The memory system 7100 includes a flash memory 7110 and a memory controller 7120. The memory system 7100 can be embedded within the electronic device 7000.

As described above, the electronic device 7000 may efficiently use a storage space by managing data by an ECC block unit and supporting a collective write operation for compressed data.

A memory system according to an embodiment of the inventive concept is applicable to a flash memory having a three-dimensional structure as well as a flash memory having a two-dimensional structure.

Figure 25:
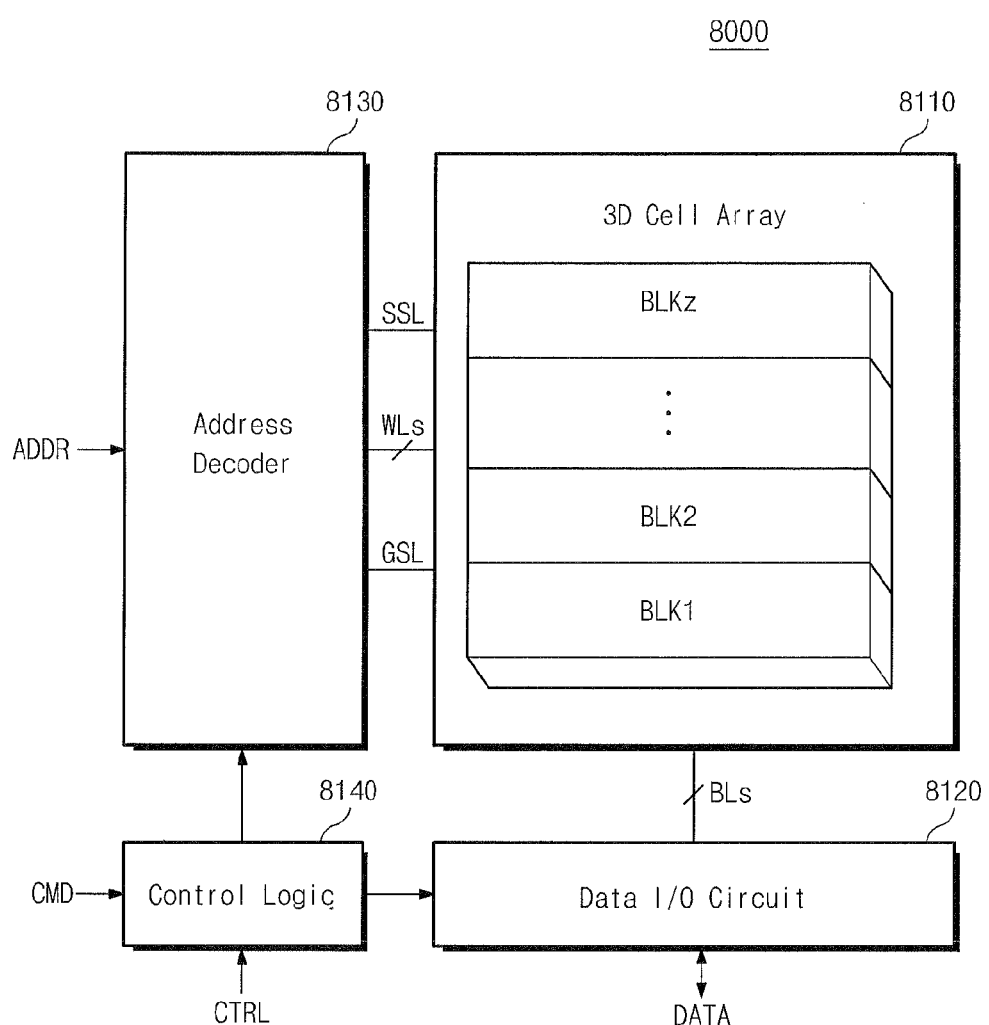
FIG. 25 is a block diagram of a flash memory applied to the inventive concept.

FIG. 25 is a block diagram of a flash memory applied to the inventive concept. Referring to FIG. 25, a flash memory 8000 includes a three-dimensional (3D) cell array 8110, a data input/output circuit 8120, an address decoder 8130, and control logic 8140.

The 3D cell array 8110 includes a plurality of memory blocks BLK1 to BLKz, each of which is formed to have a three-dimensional structure (or, a vertical structure). For a memory block having a two-dimensional (horizontal) structure, memory cells may be formed in a direction horizontal to a substrate. For a memory block having a three-dimensional structure, memory cells may be formed in a direction perpendicular to the substrate. Each memory block may be an erase unit of the flash memory 8000.

The data input/output circuit 8120 may be connected with the 3D cell array 8110 via a plurality of bit lines. The data input/output circuit 8120 may receive data from an external device or output data read from the 3D cell array 8110 to the external device. The address decoder 8130 may be connected with the 3D cell array 8110 via a plurality of word lines and selection lines GSL and SSL. The address decoder 8130 may select the word lines in response to an address ADDR.

The control logic 8140 may control programming, erasing, reading, etc. of the flash memory 8000. For example, at programming, the control logic 8140 may control the address decoder 8130 such that a program voltage is supplied to a selected word line, and may control the data input/output circuit 8120 such that data is programmed.

Figure 26:
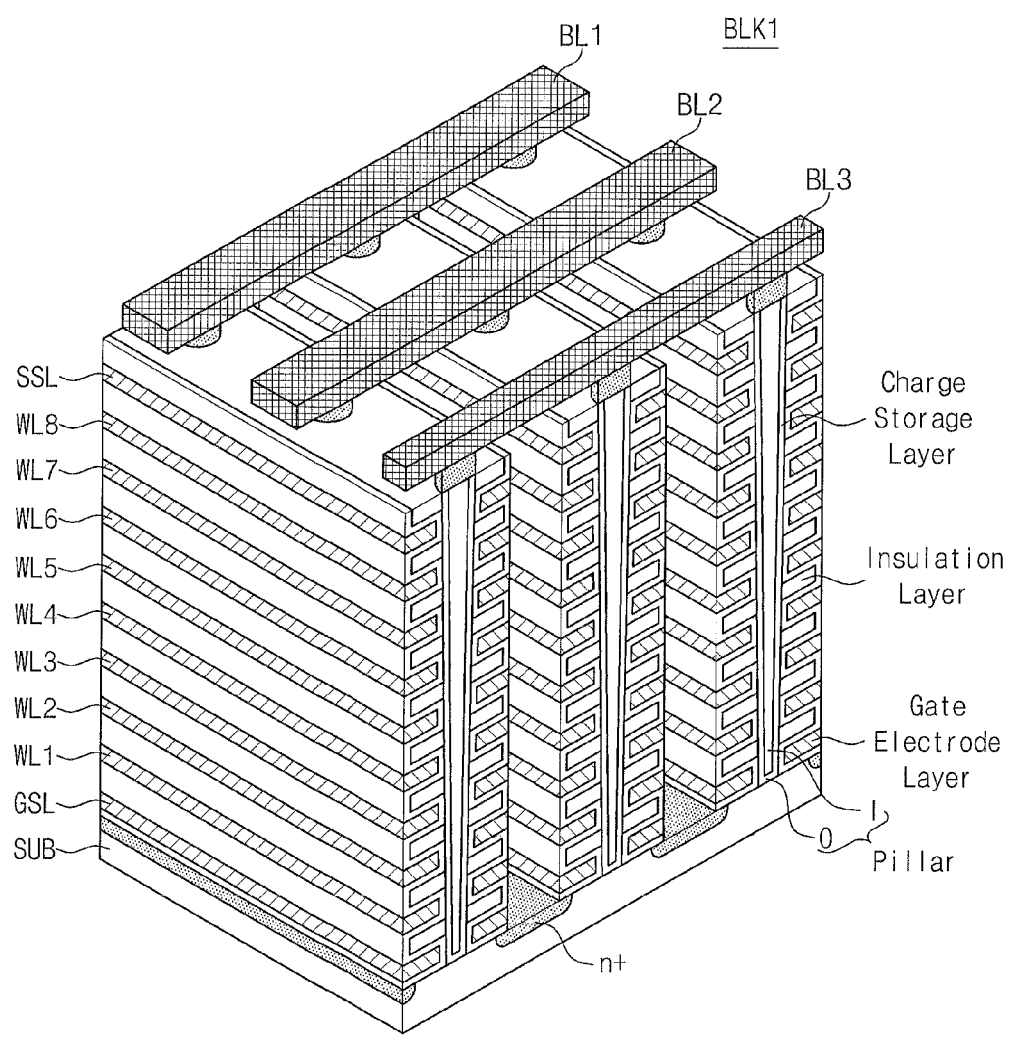
FIG. 26 is a perspective view schematically illustrating a 3D structure of a memory block in the flash memory of FIG. 25.

FIG. 26 is a perspective view schematically illustrating a 3D structure of a memory block illustrated in the flash memory of FIG. 25. Referring to FIG. 26, a memory block BLK1 may be formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer.

If the gate electrode layer and the insulation layer are patterned in a vertical direction, a V-shaped pillar may be formed. The pillar may be connected with the substrate SUB via the gate electrode layer and the insulation layer. An outer portion O of the pillar may be formed of a channel semiconductor, and an inner portion I thereof may be formed of an insulation material such as silicon oxide.

The gate electrode layer of the memory block BLK1 may be connected with a ground selection line GSL, a plurality of word lines WL1 to WL8, and a string selection line SSL. The pillar of the memory block BLK1 may be connected with a plurality of bit lines BL1 to BL3. In FIG. 13, there is illustrated the case that one memory block BLK1 has two selection lines SSL and GSL, eight word lines WL1 to WL8, and three bit lines BL1 to BL3. However, the inventive concept is not limited thereto.

Figure 27:
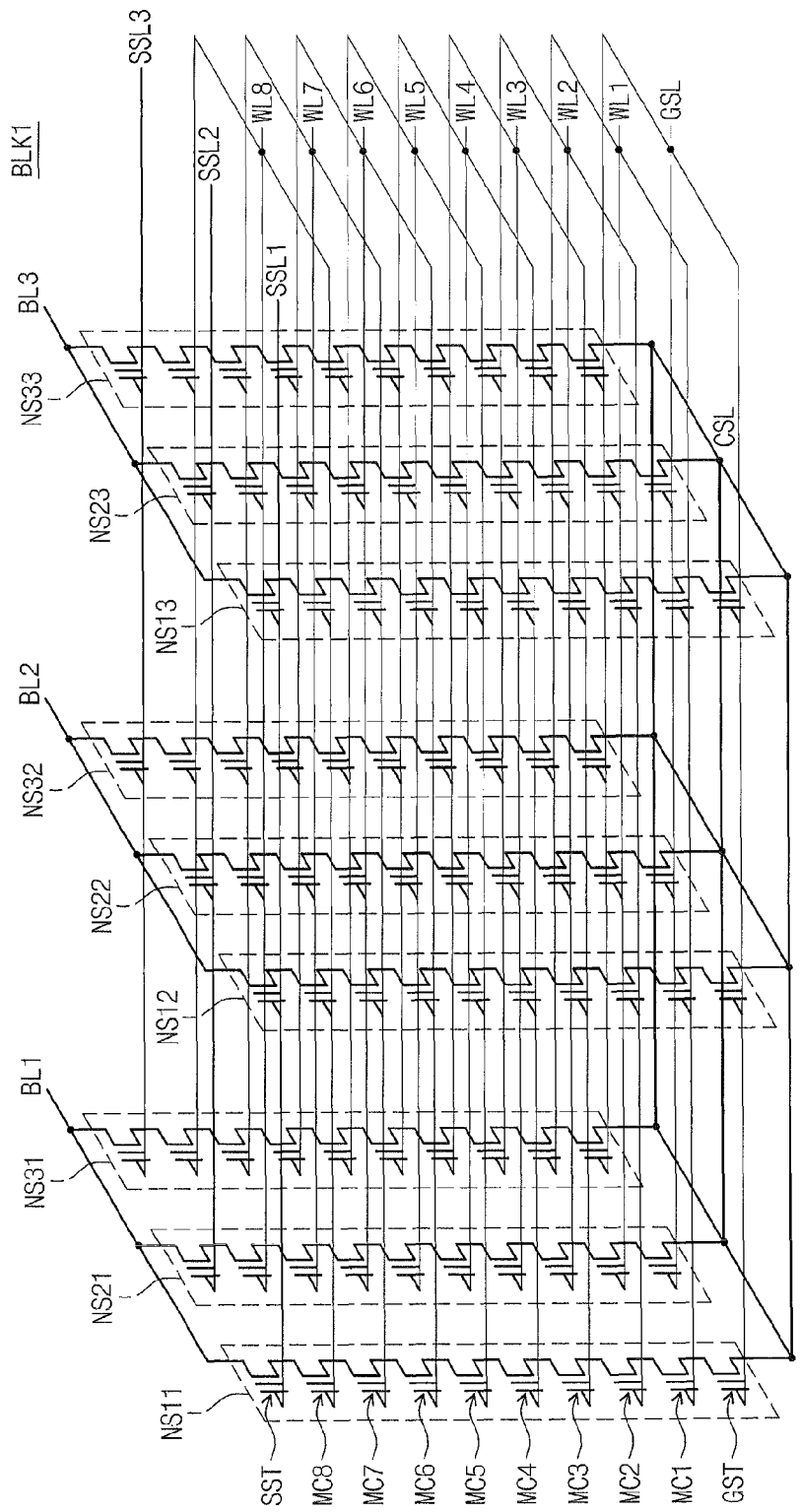
FIG. 27 is a circuit diagram of an equivalent circuit of the memory block of FIG. 26.

FIG. 27 is a circuit diagram of an equivalent circuit of the memory block of FIG. 26. Referring to FIG. 27, NAND strings NS11 to NS33 may be connected between bit lines BL1 to BL3 and a common source line CSL. Each NAND string (e.g., NS11) includes a string selection transistor SST, a plurality of memory cells MC1 to MC8, and a ground selection transistor GST.

The string selection transistors SST may be connected with string selection lines SSL1 to SSL3. The memory cells MC1 to MC8 may be connected with corresponding word lines WL1 to WL8, respectively. The ground selection transistors GST may be connected with ground selection line GSL. A string selection transistor SST may be connected with a bit line, and a ground selection transistor GST may be connected with a common source line CSL.

Word lines (e.g., WL1) having the same height may be connected in common, and the string selection lines SSL1 to SSL3 may be separated from one another. At programming of memory cells (constituting a page) connected with a first word line WL1 and included in NAND strings NS11, NS12, and NS13, there may be selected a first word line WL1, a first string selection line SSL1.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A storage device comprising:
   a user area of a memory cell array;
   a buffer area configured to temporarily store compressed data to be written into the user area; and
   a controller configured to control the user area and the buffer area such that compressed data stored in the buffer area is written into the user area,
   wherein the controller manages the compressed data to be written into the user area by a unit of an error-correction code (ECC) block,
   wherein during a write operation, the compressed data stored in the buffer area is written into the user area by a unit of a program larger than the unit of the ECC block.

2. The storage device of claim 1, wherein the ECC block has a bit-size that increases reliability of the compressed data to be written into the user area, and the ECC block includes a data bit being user data information and an ECC bit used to correct an error of the data bit.

3. The storage device of claim 1, wherein the unit of the program is an integer multiple of the unit of the ECC block.

4. The storage device of claim 1, wherein the buffer area temporarily stores a first compressed data and a second compressed data of the compressed data, and the controller writes the first and second compressed data into the same page of the user area.

5. The storage device of claim 1, further comprising:
   a compressor configured to compress write-requested raw data; and
   an ECC circuit configured to add an ECC bit to the write-requested raw data compressed by the compressor and to generate the compressed data to be written into the user area.

6. The storage device of claim 1, further comprising:
   a compressed data management table configured to manage location information of the compressed data stored in the user area,
   wherein the compressed data management table manages location information of the compressed data stored in the user area by the unit of the ECC block smaller than the unit of the program according to the control of the controller, and
   wherein the compressed data management table manages:
   information associated with the physical address of the compressed data stored in the user area,
   information associated with the start number of the ECC block of the compressed data stored in the user area.

7. The storage device of claim 6, wherein the compressed data management table further manages information associated with a logical address corresponding to the physical address of the compressed data stored in the user area.

8. The storage device of claim 6, wherein the compressed data management table manages information associated with physical addresses of first and second compressed data of the compressed data stored in the user are, and the first and second compressed data having the same physical address.

9. The storage device of claim 1, wherein the controller determines whether or not to write a second compressed data of the compressed data into the user area with a first compressed data of the compressed data, based on the bit-size of an empty region of the first compressed data, and
   if the bit-size of the empty region of the first compressed data is larger than the bit-size of the second compressed data, then the first and second compressed data is programmed into the same page of the user area.
   if the bit-size of the empty region of the first compressed data is smaller than the bit-size of the second compressed data, then the first compressed data is programmed into the user area.

10. The storage device of claim 1, wherein the buffer area includes a waiting region temporarily storing a plurality of compressed data while the controller compares the bit-size of write-requested compressed data with an empty region of each of the plurality of compressed data stored in the waiting region.

11. The storage device of claim 10, wherein if the bit-size of the write-requested compressed data is smaller than an empty region of a selected one of a plurality of compressed data stored in the waiting region, the controller writes the write-requested compressed data and the selected compressed data into the same page of the user area,
   if the bit-size of the write-requested compressed data is larger than empty regions of a plurality of compressed data stored in the waiting region, the controller transfers the write-requested compressed data to the waiting region.

12. The storage device of claim 10, wherein the controller the bit-size of the waiting region with a reference bit-size, and writes a selected one of a plurality of compressed data stored in the waiting region if the bit-size of the waiting region is larger than the reference bit-size.

13. The storage device of claim 1, wherein the controller compares the bit-size of an empty region of a first compressed data of the compressed data with the bit-size of a second compressed data of the compressed data, and divides the second compressed data if the bit-size of the empty region of the first compressed data is smaller than the bit-size of the second compressed data.

14. The storage device of claim 13, wherein the controller divides the second compressed data into first and second divided compressed data and the bit-size of the first divided compressed data is smaller than the bit-size of an empty region of the first compressed data,
   wherein the controller writes the first compressed data and the first divided compressed data at the same page of the user area.

15. The storage device of claim 1, wherein the controller simultaneously writes at least two compressed data stored in the buffer area into a plurality of pages of the user area.

16. An operating method of a nonvolatile memory device comprising:
   compressing write-requested data;
   collecting the compressed data in a random access memory (RAM);
   programming the compressed data collected in the RAM at a nonvolatile memory; and
   updating a compressed data management table for managing the compressed data programmed in the nonvolatile memory by a unit of an error-correction code (ECC) block,
   wherein the programming of the compressed data includes writing the compressed data into the nonvolatile memory by a unit of a program larger than the unit of the ECC block.

17. The operating method of claim 16, further comprising:
   comparing the bit-size of the write-requested data with the bit-size of each of empty regions of a plurality of compressed data stored in the RAM,
   wherein if the bit-size of the write-requested data is smaller than the bit-size of an empty region of a selected one of the plurality of compressed data stored in the RAM, the write-requested data and the selected compressed data are programmed into the same page of the nonvolatile memory.

18. A solid state disk comprising:
at least one nonvolatile memory device configured to perform a program operation by a unit of a program corresponding to a plurality of pages; and
a controller configured to comprise a buffer memory to temporarily store compressed data and configured to control the buffer memory and the at least one nonvolatile memory device such that the compressed data stored in the buffer memory is written into the at least one nonvolatile memory device,
wherein the controller manages the compressed data written in the at least one nonvolatile memory device by a unit of an error-correction code (ECC) block,
wherein during a program operation, the compressed data stored in the buffer memory is written into the at least one nonvolatile memory device by the unit of the program larger than the unit of the ECC block.

19. The solid state disk of claim 18 wherein the buffer memory stores a plurality of compressed data, the plurality of compressed data stored in the buffer memory to be simultaneously programmed into a predetermined page of the at least one nonvolatile memory device when a size of the plurality of compressed data stored in the buffer memory is smaller than the unit of the program corresponding to the plurality of pages.

20. The solid state disk of claim 18, wherein the controller further comprising:
a compressed data management table configured to manage location information of the compressed data written in the at least one nonvolatile memory device,
wherein the compressed data is stored by the unit of the ECC block smaller than a bit-size of a page under the control of the controller.

21. The solid state disk of claim 18, wherein the at least one nonvolatile memory device includes a plurality of compressed data programmed by one program operation, and predetermined compressed data of the plurality of compressed data is divided to be stored in at least two pages of the at least one nonvolatile memory device.

22. A storage device comprising:
a nonvolatile memory device that comprises a three-dimensional memory array; and
a memory controller that controls the nonvolatile memory device,
wherein the memory controller configured to comprises a buffer memory to temporarily store compressed data to be written into the nonvolatile memory device and configured to control the nonvolatile memory device and the buffer memory such that the compressed data stored in the buffer memory is written into the nonvolatile memory,
wherein the controller manages the compressed data to be written into the nonvolatile memory device by a unit of an error-correction code (ECC) block,
wherein during a write operation, the compressed data stored in the buffer memory is written into the nonvolatile memory device by a unit of a program larger than the unit of the ECC block.

23. The storage device of claim 22, wherein the memory controller determines whether or not to write a second compressed data of the compressed data into the nonvolatile memory device with a first compressed data of the compressed data, based on a bit-size of an empty region of the first compressed data, and
if the bit-size of the empty region of the first compressed data is larger than the bit-size of the second compressed data, then the first and second compressed data is programmed into the same page of the nonvolatile memory device,
if the bit-size of the empty region of the first compressed data is smaller than the bit-size of the second compressed data, then the first compressed data is programmed into the nonvolatile memory device.

24. The storage device of claim 22, wherein the memory controller further comprising:
a compressed data management table configured to manage location information of the compressed data stored in the nonvolatile memory device,
wherein the compressed data management table manages location information of the compressed data stored in the nonvolatile memory device by the unit of the ECC block smaller than the unit of the program according to the control of the memory controller, and
wherein the compressed data management table manages:
information associated with the physical address of the compressed data stored in the nonvolatile memory device,
information associated with the start number of the ECC block of the compressed data stored in the nonvolatile memory device, and
information associated with the ECC block length of the compressed data stored in the nonvolatile memory device.

* * * * *